US009753338B2

(12) United States Patent
Murata et al.

(10) Patent No.: US 9,753,338 B2
(45) Date of Patent: Sep. 5, 2017

(54) FRINGE FIELD SWITCHING LIQUID CRYSTAL DISPLAY DEVICE

(71) Applicant: Sharp Kabushiki Kaisha, Sakai, Osaka (JP)

(72) Inventors: Mitsuhiro Murata, Sakai (JP); Hidefumi Yoshida, Sakai (JP); Yosuke Iwata, Sakai (JP); Satoshi Matsumura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/310,480

(22) PCT Filed: May 8, 2015

(86) PCT No.: PCT/JP2015/063353

§ 371 (c)(1), (2) Date: Nov. 11, 2016

(87) PCT Pub. No.: WO2015/174349

PCT Pub. Date: Nov. 19, 2015

(65) Prior Publication Data

US 2017/0090255 A1 Mar. 30, 2017

(30) Foreign Application Priority Data

May 13, 2014 (JP) ................................ 2014-099712

(51) Int. Cl.

*G02F 1/1335* (2006.01)
*G02F 1/1337* (2006.01)

(Continued)

(52) U.S. Cl.

CPC ........ *G02F 1/134363* (2013.01); *G02F 1/137* (2013.01); *G02F 1/1337* (2013.01);

(Continued)

(58) Field of Classification Search

CPC ............... G02F 1/134363; G02F 1/137; G02F 1/133345; G02F 1/133707;

(Continued)

(56) References Cited

U.S. PATENT DOCUMENTS 6,097,465 A 8/2000 Hiroki et al.
7,466,383 B2 * 12/2008 Lee .................. G02F 1/133753 349/128

(Continued)

FOREIGN PATENT DOCUMENTS

JP 09-236819 A 9/1997
JP 10-133190 A 5/1998

(Continued)

OTHER PUBLICATIONS

Official Communication issued in International Patent Application No. PCT/JP2015/063353, mailed on Jul. 28, 2015.

*Primary Examiner* — Tracie Y Green

(74) *Attorney, Agent, or Firm* — Keating & Bennett, LLP

(57) ABSTRACT

A first substrate (10) of a liquid crystal display device (100) includes: an alignment film defining an initial alignment azimuthal direction (D), which is an alignment azimuthal direction of liquid crystal molecules (31) when no electric field is applied through a liquid crystal layer (30); a first electrode (11) and a second electrode (12) capable of producing a fringe electric field (FE) that aligns the liquid crystal molecules in an azimuthal direction that is different from the initial alignment azimuthal direction; and a third electrode (13) and a fourth electrode (14) capable of producing a lateral electric field that aligns the liquid crystal molecules in the initial alignment azimuthal direction.

11 Claims, 25 Drawing Sheets

(51) Int. Cl.
*G02F 1/1343* (2006.01)
*G02F 1/1333* (2006.01)
*G02F 1/137* (2006.01)

(52) U.S. Cl.
CPC .. *G02F 1/133345* (2013.01); *G02F 1/133528* (2013.01); *G02F 1/133707* (2013.01); *G02F 2001/13712* (2013.01); *G02F 2001/133531* (2013.01); *G02F 2001/134372* (2013.01); *G02F 2001/134381* (2013.01); *G02F 2203/64* (2013.01)

(58) Field of Classification Search
CPC ............. G02F 1/133528; G02F 1/1337; G02F 2001/134372; G02F 2001/133531; G02F 2001/13712; G02F 2203/64; G02F 2001/134381
See application file for complete search history.

(56) References Cited

U.S. PATENT DOCUMENTS 7,535,534 B2 * 5/2009 Lee .................. G02F 1/134363 349/129
7,855,772 B2 * 12/2010 Wang ................ G02F 1/133707 349/141
9,041,896 B2 * 5/2015 Senbonmatsu ....... G02F 1/1337 349/172
9,341,893 B2 * 5/2016 Miyachi ................. C09K 19/18
2001/0050742 A1 12/2001 Takeda et al.
2002/0041354 A1 4/2002 Noh et al.
2007/0252938 A1 11/2007 Choi et al.
2014/0132644 A1 5/2014 Rossini

FOREIGN PATENT DOCUMENTS

JP 2000-193977 A 7/2000
JP 2002-182230 A 6/2002
JP 2003-015160 A 1/2003
JP 3900859 B2 4/2007
JP 2007-298983 A 11/2007
JP 2009-086576 A 4/2009
WO 2012/175250 A1 12/2012

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

FRINGE FIELD SWITCHING LIQUID CRYSTAL DISPLAY DEVICE

TECHNICAL FIELD

The present invention relates to a liquid crystal display device, and particularly to a liquid crystal display device that controls the alignment state of liquid crystal molecules using a fringe electric field.

BACKGROUND ART

In recent years, the fringe field switching (FFS) mode has often been employed as the display mode of liquid crystal display devices for smartphones and tablet devices. A liquid crystal display device of the FFS mode is disclosed in Patent Document No. 1, for example.

A liquid crystal display device of the FFS mode includes a pair of electrodes for producing a fringe electric field on one of a pair of substrates sandwiching therebetween a liquid crystal layer of a horizontal alignment type. This pair of electrodes typically are a pixel electrode having a plurality of slits, and a common electrode placed under the pixel electrode with an insulating layer therebetween. When a voltage is applied between the pixel electrode and the common electrode, a fringe electric field is produced, and the alignment direction of the liquid crystal molecules change due to the alignment regulating force of the fringe electric field.

Thus, with a liquid crystal display device of the FFS mode, the alignment state of the liquid crystal molecules is controlled by using a fringe electric field. In the FFS mode, the liquid crystal molecules rotate in a plane that is parallel to the display surface, thereby realizing desirable viewing angle characteristics.

Patent Document No. 2 discloses a technique in which a flattening film having depressed portions and protruding portions is provided under the common electrode in order to improve the response speed in the FFS mode. Patent Document No. 2 states that such a structure gives the common electrode protrusions/depressions reflecting the surface shape of the flattening film, thereby allowing a stronger fringe electric field to be produced.

CITATION LIST

Patent Literature

[Patent Document No. 1] Japanese Laid-Open Patent Publication No. 2002-182230

[Patent Document No. 2] Japanese Laid-Open Patent Publication No. 2009-86576

SUMMARY OF INVENTION

Technical Problem

However, although the technique of Patent Document No. 2 improves the response speed upon application of a fringe electric field through the liquid crystal layer (when the voltage is turned ON), it does not improve the response speed upon removal of a fringe electric field (when the voltage is turned OFF).

It is an object of the present invention, which has been made in view of the problem set forth above, to improve the response characteristics of a liquid crystal display device that controls the alignment state of liquid crystal molecules by using a fringe electric field.

Solution To Problem

A liquid crystal display device according to an embodiment of the present invention has a plurality of pixels arranged in a matrix pattern, the liquid crystal display device including: a first substrate and a second substrate provided so as to oppose each other; and a liquid crystal layer provided between the first substrate and the second substrate, the first substrate including: an alignment film provided so as to be in contact with the liquid crystal layer, the alignment film defining an initial alignment azimuthal direction, which is an alignment azimuthal direction of liquid crystal molecules when no electric field is applied through the liquid crystal layer; a first electrode and a second electrode capable of producing a fringe electric field that aligns the liquid crystal molecules in an azimuthal direction that is different from the initial alignment azimuthal direction; and a third electrode and a fourth electrode capable of producing a lateral electric field that aligns the liquid crystal molecules in the initial alignment azimuthal direction.

In one embodiment, the liquid crystal molecules have a negative dielectric anisotropy.

In one embodiment, the third electrode and the fourth electrode each extend generally parallel to the initial alignment azimuthal direction.

In one embodiment, directions in which the third electrode and the fourth electrode extend and the initial alignment azimuthal direction are generally parallel to a longitudinal direction of the pixels.

In one embodiment, directions in which the third electrode and the fourth electrode extend and the initial alignment azimuthal direction are generally parallel to a width direction of the pixels.

In one embodiment, the first electrode has at least one slit and is provided on the second electrode with at least one insulating layer therebetween.

In one embodiment, the at least one insulating layer includes a first insulating layer covering the second electrode and a second insulating layer provided on the first insulating layer; and the third electrode and the fourth electrode are provided between the first insulating layer and the second insulating layer.

In one embodiment, the third electrode and the fourth electrode are provided in the same layer as the first electrode.

In one embodiment, the second substrate includes a fifth electrode and a sixth electrode capable of producing a lateral electric field that aligns the liquid crystal molecules in the initial alignment azimuthal direction.

In one embodiment, display is produced in a normally black mode; the fringe electric field is produced by the first electrode and the second electrode when displaying white; and the lateral electric field is produced by the third electrode and the fourth electrode when displaying black.

In one embodiment, the liquid crystal display device having the configuration described above further includes a pair of polarizers opposing each other with at least the liquid crystal layer therebetween, wherein: the pair of polarizers are placed in a crossed Nicols arrangement; and a transmission axis of one of the pair of polarizers is generally parallel to the initial alignment azimuthal direction, and a transmission axis of the other polarizer is generally perpendicular to the initial alignment azimuthal direction.

Advantageous Effects Of Invention

According to the embodiments of the present invention, it is possible to improve the response characteristics of a liquid crystal display device that controls the alignment state of liquid crystal molecules using a fringe electric field.

DESCRIPTION OF EMBODIMENTS

Embodiments of the present invention will now be described with reference to the drawings. Note that the present invention is not limited to the following embodiments.

(Embodiment 1)

Figure 1:
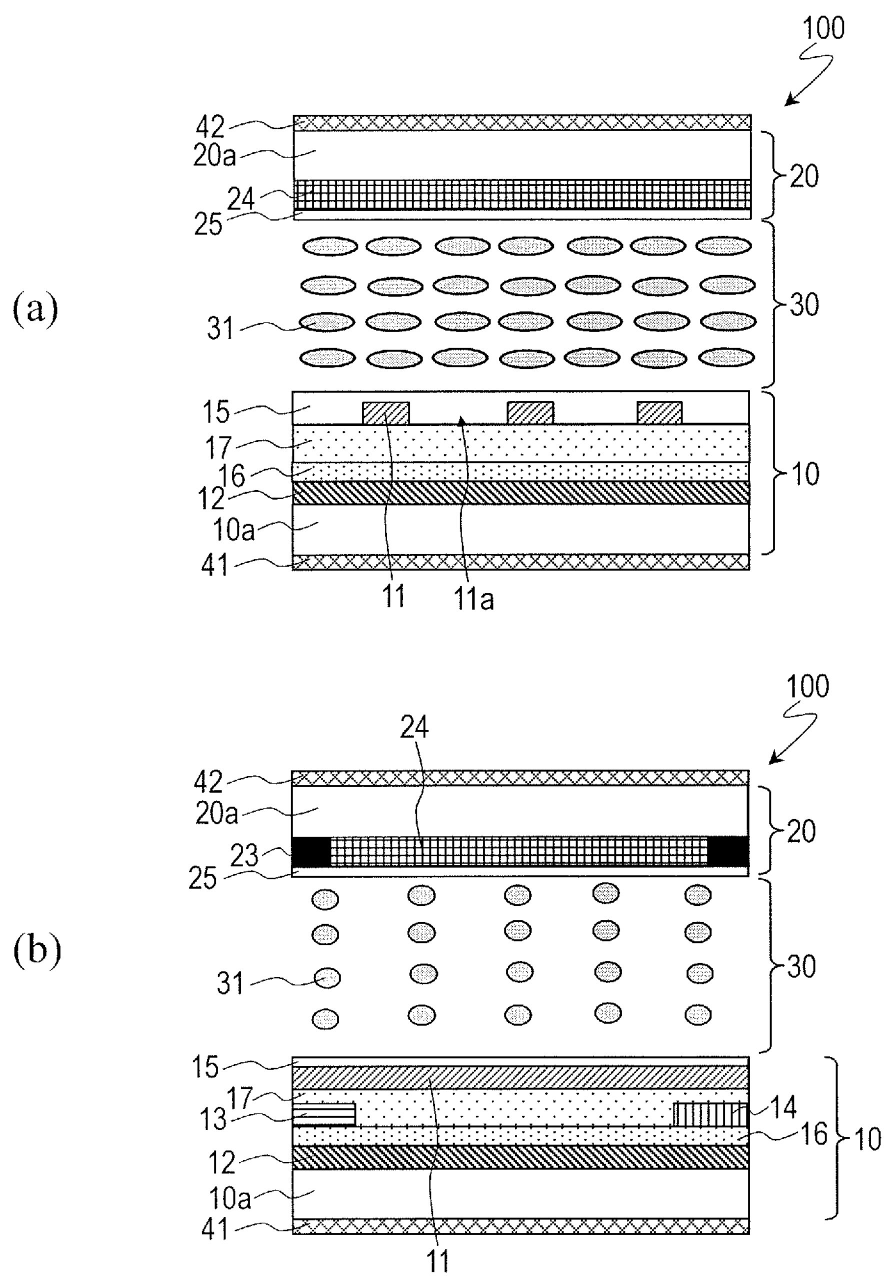
FIG. 1 (*a*) and (*b*) are cross-sectional views taken along line 1A-1A' and 1B-1B', respectively, of FIG. 2, each schematically showing a liquid crystal display device 100 of an embodiment of the present invention.
Figure 2:
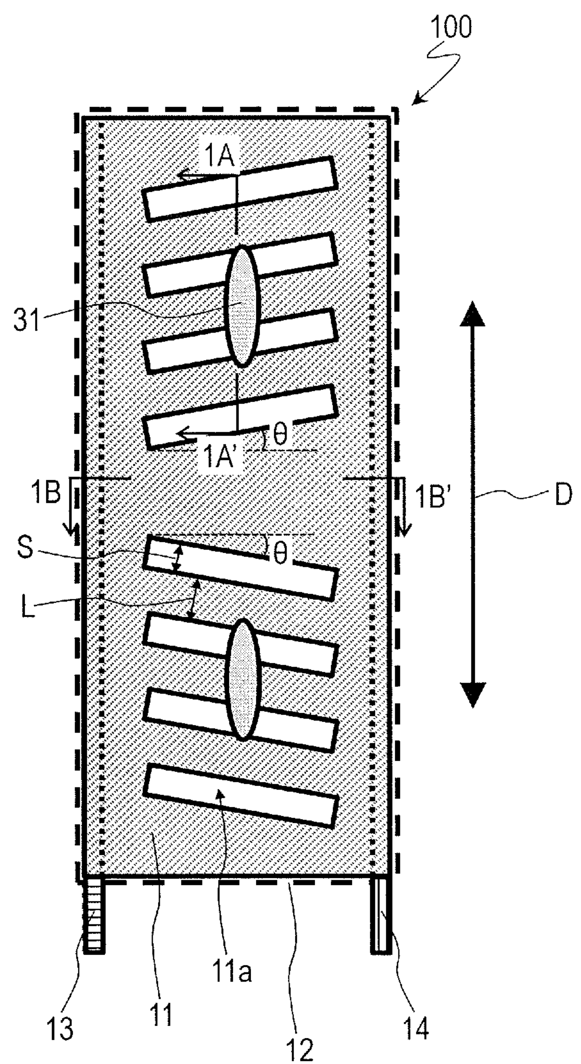
FIG. 2A plan view schematically showing the liquid crystal display device 100, showing a one-pixel region of the liquid crystal display device 100.

FIG. 1 and FIG. 2 show a liquid crystal display device 100 of the present embodiment. FIGS. 1(*a*) and 1(*b*) are cross-sectional views schematically showing the liquid crystal display device 100, and FIG. 2 is a plan view schematically showing the liquid crystal display device 100. FIG. 2 shows a one-pixel region of the liquid crystal display device 100, and FIGS. 1(*a*) and 1(*b*) show cross sections taken along line 1A-1A' and line 1B-1B', respectively, of FIG. 2. FIGS. 1(*a*) and 1(*b*) and FIG. 2 show a state in which no electric field is applied through a liquid crystal layer 30.

As shown in FIGS. 1(*a*) and 1(*b*), the liquid crystal display device 100 includes an active matrix substrate (first substrate) 10 and a counter substrate (second substrate) 20 provided so as to oppose each other, and the liquid crystal layer 30 provided between the active matrix substrate 10 and the counter substrate 20. The liquid crystal display device 100 also includes a plurality of pixels arranged in a matrix pattern. The liquid crystal display device 100 further includes a pair of polarizers 41 and 42 opposing each other with at least the liquid crystal layer 30 therebetween, and produces display in the normally black mode.

The liquid crystal layer 30 is formed from a negative nematic liquid crystal material. That is, liquid crystal molecules 31 included in the liquid crystal layer 30 have a negative dielectric anisotropy ($\Delta\in<0$).

The active matrix substrate 10 includes an alignment film 15 provided so as to be in contact with the liquid crystal layer 30, a first electrode 11 and a second electrode 12 (the first electrode pair), which are capable of producing a fringe electric field, and a third electrode 13 and a fourth electrode 14 (the second electrode pair), which are capable of producing a lateral electric field. The components of the active matrix substrate 10 are supported on an insulative transparent substrate (e.g., a glass substrate) 10*a*.

The alignment film 15 defines the initial alignment azimuthal direction D, which is the alignment azimuthal direction of the liquid crystal molecules 31 when no electric field is applied through the liquid crystal layer 30. As shown in FIG. 2, in the present embodiment, the initial alignment azimuthal direction D is generally parallel to the longitudinal direction of the pixels (herein, the vertical direction on the display surface). The alignment film 15 functions primarily as a horizontal alignment film defining the alignment azimuthal direction of the liquid crystal molecules 31.

The fringe electric field produced by the first electrode 11 and the second electrode 12 aligns the liquid crystal molecules 31 in an azimuthal direction that is different from the initial alignment azimuthal direction D. One of the first electrode 11 and the second electrode 12 is the pixel electrode and the other is the common electrode. In the configuration illustrated herein, the first electrode 11 is the pixel electrode, and the second electrode 12 is the common electrode (which may be referred to herein also as the "first common electrode" to distinguish it from the "second common electrode" to be discussed later).

The first electrode (pixel electrode) 11 is electrically connected to the drain electrode of the thin film transistor (TFT), which is provided in each pixel, and receives a display signal voltage supplied thereto via the TFT. The first electrode 11 is formed from a transparent conductive material (e.g., ITO or IZO (registered trademark)).

The first electrode 11 includes a plurality of slits 11*a*. These slits 11*a* extend in a direction that crosses the initial alignment azimuthal direction D. In the example shown in FIG. 2, the slits 11*a* formed in the upper half of the pixel and the slits 11*a* formed in the lower half of the pixel extend in directions different from each other. Specifically, with respect to the direction perpendicular to the initial alignment azimuthal direction D (the horizontal direction on the display surface), the slits 11*a* in the upper half of the pixel are inclined counterclockwise by a predetermined angle θ, and the slits 11*a* in the lower half of the pixel are inclined clockwise by the predetermined angle θ. The angle θ is 10° , for example, but it is understood that the angle θ is not limited thereto. The width S of the slits 11*a* and the interval L between adjacent slits 11*a* are, for example, 4 μm and 3 μm, respectively, but it is understood that they are not limited thereto. The number of the slits 11*a* is not limited to that shown in FIG. 2. There is no particular limitation as long as at least one slit 11*a* is formed in the first electrode 11.

The first electrode 11 is provided on the second electrode 12 with at least one insulating layer (dielectric layer) therebetween. In the present embodiment, the first electrode 11 is provided on the second electrode 12 with a first insulating layer 16 and a second insulating layer 17 therebetween, the first insulating layer 16 covering the second electrode 12 and the second insulating layer 17 provided on the first insulating layer 16. The first insulating layer 16 and the second insulating layer 17 may each be an organic insulating layer (whose dielectric constant ∈r is about 3 to 4, for example) or an inorganic insulating layer (whose dielectric constant ∈r is about 5 to 7, for example).

The second electrode (first common electrode) 12 receives a voltage (common voltage) that is common to a plurality of pixels. The second electrode 12 is typically a solid electrode (an electrode with no slits, or the like). The second electrode 12 is formed from a transparent conductive material (e.g., ITO or IZO (registered trademark)).

The lateral electric field produced by the third electrode 13 and the fourth electrode 14 aligns the liquid crystal molecules 31 in the initial alignment azimuthal direction D, as will be described later. Each of the third electrode 13 and the fourth electrode 14 has an elongate shape (strip shape), and extends generally parallel to the initial alignment azimuthal direction D (i.e., generally parallel to the longitudinal direction of the pixels). In the present embodiment, the third electrode 13 and the fourth electrode 14 are provided between the first insulating layer 16 and the second insulating layer 17 as shown in FIG. 1(*b*). The third electrode 13 and the fourth electrode 14 may be formed from a transparent conductive material such as ITO, or from a metal material. The width of each of the third electrode 13 and the fourth electrode 14 is, for example, 3 μm (it is understood that the width is not limited thereto).

The third electrode 13 and the fourth electrode are given a potential difference such that it is possible to produce a lateral electric field of a sufficient intensity. When a lateral electric field is produced, a voltage of the same level as that applied to the pixel electrode (first electrode) 11 when displaying white is applied to the third electrode 13, and a voltage of the same level as that applied to the common electrode (second electrode) 12 (common voltage) is applied to the fourth electrode 14, for example. Hereinafter, the third electrode 13 may be referred to as the "OFF electrode" (the electrode for realizing the same alignment state as that when the voltage is OFF), and the fourth electrode 14 may be referred to as the "second common electrode".

The counter substrate 20 includes a light-blocking layer 23 and a color filter layer 24, and includes an alignment film 25 provided so as to be in contact with the liquid crystal layer 30. The components of the counter substrate 20 are supported on an insulative transparent substrate (e.g., a glass substrate) 20*a*.

The light-blocking layer 23 is referred to also as a black matrix. The light-blocking layer 23 is formed from a photosensitive black resin material, for example.

The color filter layer 24 typically includes red color filters, green color filters and blue color filters 22. The red color filters, the green color filters and the blue color filters are formed from a photosensitive colored resin material, for example.

The alignment azimuthal direction of the liquid crystal molecules 31 defined by the alignment film 25 is parallel or antiparallel to the alignment azimuthal direction of the liquid crystal molecules 31 defined by the alignment film 15 (the initial alignment azimuthal direction D). As does the alignment film 15, the alignment film 25 also functions primarily as a horizontal alignment film defining the alignment azimuthal direction of the liquid crystal molecules 31.

The pre-tilt angle of the liquid crystal molecules 31 defined by the alignment films 15 and 25 is typically set to 2° or less. Note that the pre-tilt angle of the liquid crystal molecules 31 is preferably 0.1° or more and 2.0° or less. The alignment films 15 and 25 may be formed from an organic material or may be formed from an inorganic material. Moreover, the alignment treatment to be performed on the alignment films 15 and 25 may be a photo-alignment treatment or a rubbing treatment.

Note that it is preferred that a flattening layer (overcoat layer) is provided so as to cover the light-blocking layer 23 and the color filter layer 24 of the counter substrate 20 (i.e., between the light-blocking layer 23 and the color filter layer 24 and the alignment film 25). The flattening layer is formed from a resin material whose dielectric constant ∈r is about 3 to 4, for example.

The pair of polarizers 41 and 42 are placed in a crossed Nicols arrangement. The transmission axis of one of the pair of polarizers 41 and 42 is generally parallel to the initial alignment azimuthal direction D, and the transmission axis of the other polarizer is generally perpendicular to the initial alignment azimuthal direction D. Note that although the polarizers 41 and 42 are provided on one side of the active matrix substrate 10 and the counter substrate 20 that is away from the liquid crystal layer 30 in FIGS. 1(*a*) and 1(*b*), the arrangement of the polarizers 41 and 42 is not limited thereto.

Figure 3:
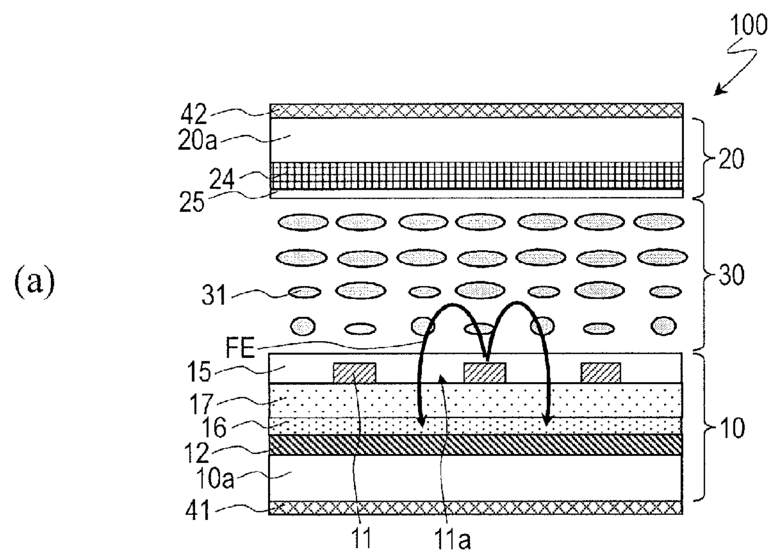
FIG. 3 (*a*) and (*b*) are a cross-sectional view and a plan view, respectively, schematically showing the alignment state of liquid crystal molecules 31 when switching display from the black display state to the white display state on the liquid crystal display device 100, wherein (a) shows a cross section taken along line 3A-3A' of (b).
Figure 3:
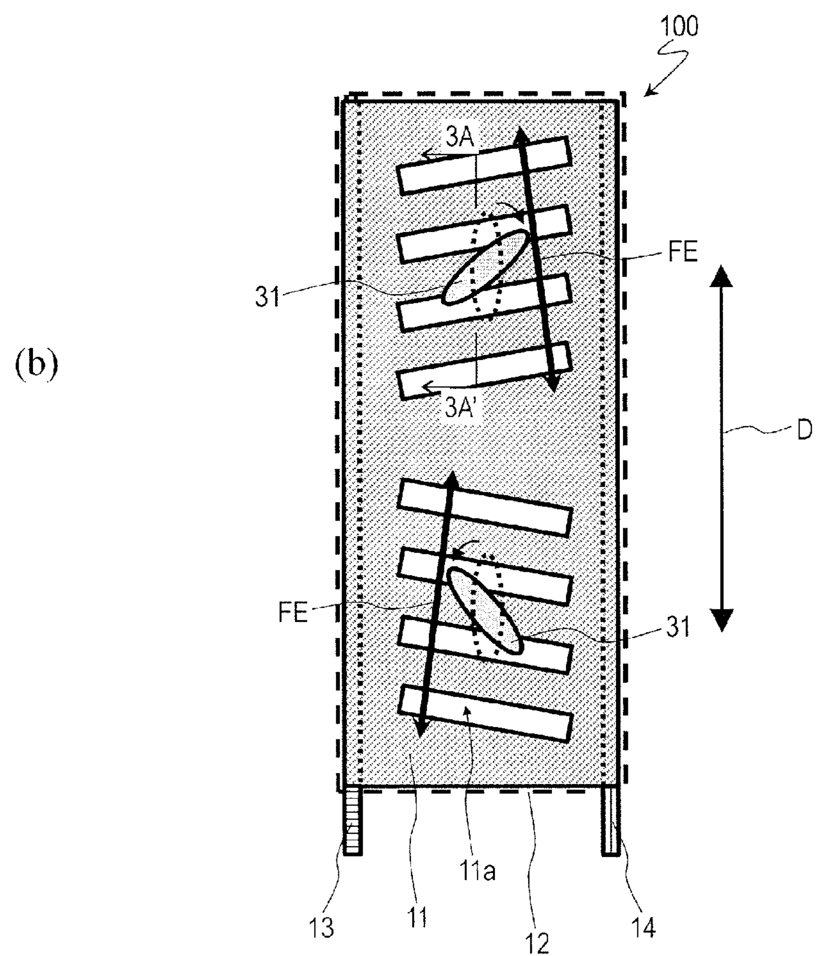
Figure 4:
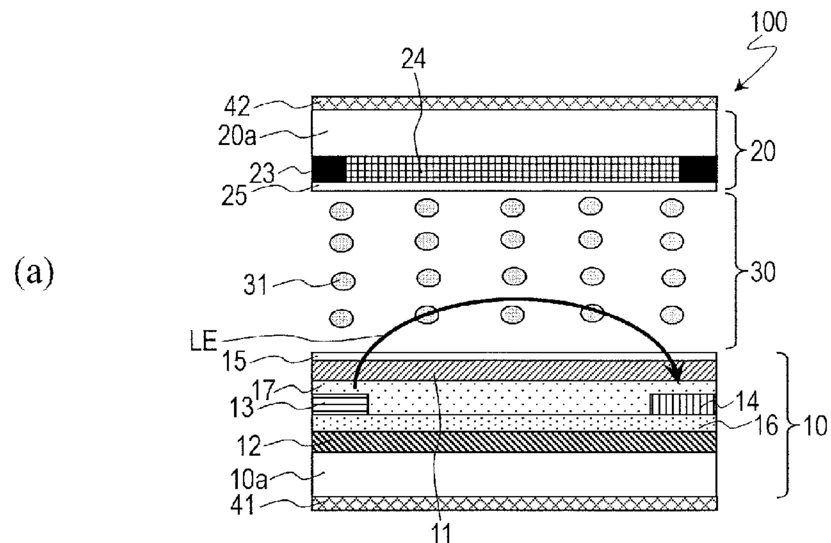
FIG. 4 (*a*) and (*b*) are a cross-sectional view and a plan view, respectively, schematically showing the alignment state of the liquid crystal molecules 31 when switching display from the white display state to the black display state on the liquid crystal display device 100, wherein (a) shows a cross section taken along line 4A-4A' of (b).
Figure 4:
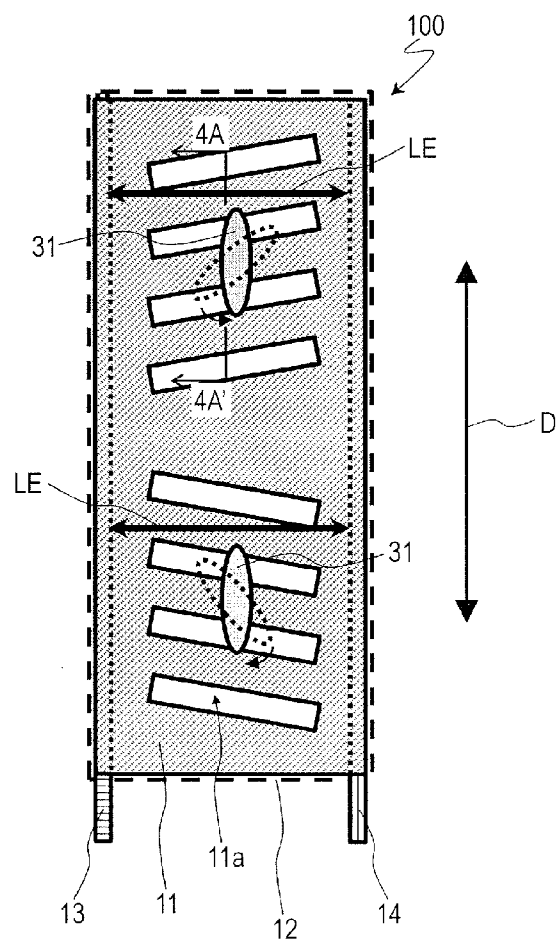

With the liquid crystal display device 100 of the present embodiment, a fringe electric field is produced by the first electrode (pixel electrode) 11 and the second electrode (first common electrode) 12 when displaying white, and a lateral electric field is produced by the third electrode (OFF electrode) 13 and the fourth electrode (second common electrode) 14 when displaying black. Referring to FIG. 3 and FIG. 4, the change of alignment when displaying white and that when displaying black will now be described.

FIGS. 3(*a*) and 3(*b*) are a cross-sectional view and a plan view, respectively, schematically showing the alignment state of the liquid crystal molecules 31 when switching display from the black display state to the white display state. FIG. 3(*a*) shows a cross section taken along line 3A-3A' of FIG. 3(*b*).

As shown in FIGS. 3(*a*) and 3(*b*), when displaying white, a fringe electric field FE is produced through the liquid crystal layer 30 by the first electrode 11 and the second electrode 12, which are provided in different layers (at different levels) from each other. The direction of the fringe electric field FE as seen from the display surface normal direction is perpendicular to the direction in which the slits 11*a* of the first electrode 11 extend, thus exerting a torque on the liquid crystal molecules 31 such that the alignment direction thereof changes toward an azimuthal direction that is perpendicular to the direction of the fringe electric field FE. Therefore, as shown in FIG. 3(*b*), the liquid crystal molecules 31 rotate clockwise in the upper half of the pixel, and the liquid crystal molecules 31 rotate counterclockwise in the lower half of the pixel. Thus, the fringe electric field FE produced by the first electrode 11 and the second electrode 12 aligns the liquid crystal molecules 31 in an azimuthal direction that is different from the initial alignment azimuthal direction D.

FIGS. 4(*a*) and 4(*b*) are a cross-sectional view and a plan view, respectively, schematically showing the alignment state of the liquid crystal molecules 31 when switching display from the white display state to the black display state. FIG. 4(*a*) shows a cross section taken along line 4A-4A' of FIG. 4(*b*).

As shown in FIGS. 4(*a*) and 4(*b*), when displaying black, a lateral electric field LE is produced through the liquid crystal layer 30 by the third electrode 13 and the fourth electrode 14, which are provided in the same layer (on the same level). The direction of the lateral electric field LE as seen from the display surface normal direction is perpendicular to the direction in which the third electrode 13 and the fourth electrode 14 extend, thus exerting a torque on the liquid crystal molecules 31 such that the alignment direction thereof changes toward an azimuthal direction that is perpendicular to the direction of the lateral electric field LE (herein, the vertical direction on the display surface). Therefore, as shown in FIG. 4(*b*), the liquid crystal molecules 31 rotate counterclockwise in the upper half of the pixel, and the liquid crystal molecules 31 rotate clockwise in the lower half of the pixel. Thus, the lateral electric field LE produced by the third electrode 13 and the fourth electrode 14 aligns the liquid crystal molecules 31 in the initial alignment azimuthal direction D.

Figure 5:
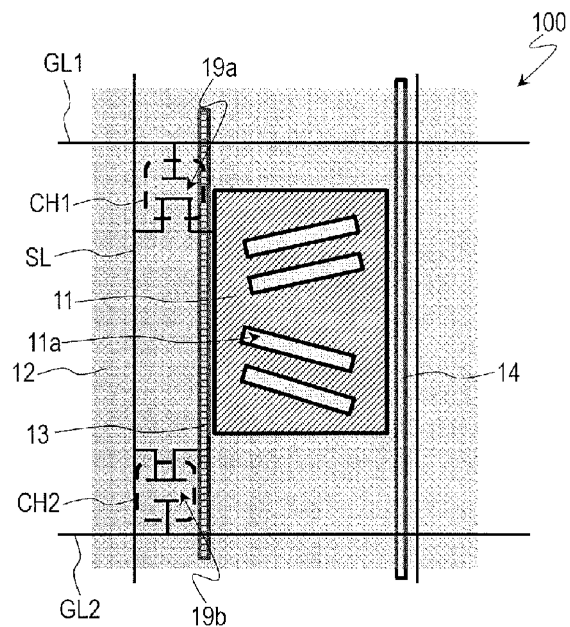
FIG. 5 A view showing a connection relationship between electrodes and lines in the liquid crystal display device 100.

FIG. 5 shows a connection relationship between electrodes and lines in the liquid crystal display device 100. As shown in FIG. 5, two TFTs (thin film transistors) 19*a*and 19*b* are provided in each pixel.

The drain electrode of one of the two TFTs 19*a* and 19*b* (the first TFT 19*a*) is electrically connected to the first electrode 11 via a contact hole CH1. The gate electrode of the first TFT 19*a* is electrically connected to the first scanning line (first gate bus line) GL1, and the source electrode of the first TFT 19*a* is electrically connected to the signal line (source bus line) SL. The first TFT 19*a* receives a scanning signal supplied from the first scanning line GL1 and a display signal supplied from the signal line SL. A display signal voltage is applied to the first electrode 11 via the first TFT 19*a*.

The drain electrode of the other one of the two TFTs 19*a* and 19*b* (the second TFT 19*b*) is electrically connected to the third electrode 13 via a contact hole CH2. The gate electrode of the second TFT 19*b* is electrically connected to the second scanning line (second gate bus line) GL2, and the source electrode of the second TFT 19*b* is electrically connected to the signal line (source bus line) SL. The second TFT 19*b* receives a scanning signal supplied from the second scanning line GL2 and a display signal supplied from the signal line SL. A display signal voltage is applied to the third electrode 13 via the second TFT 19*b*.

Figure 6:
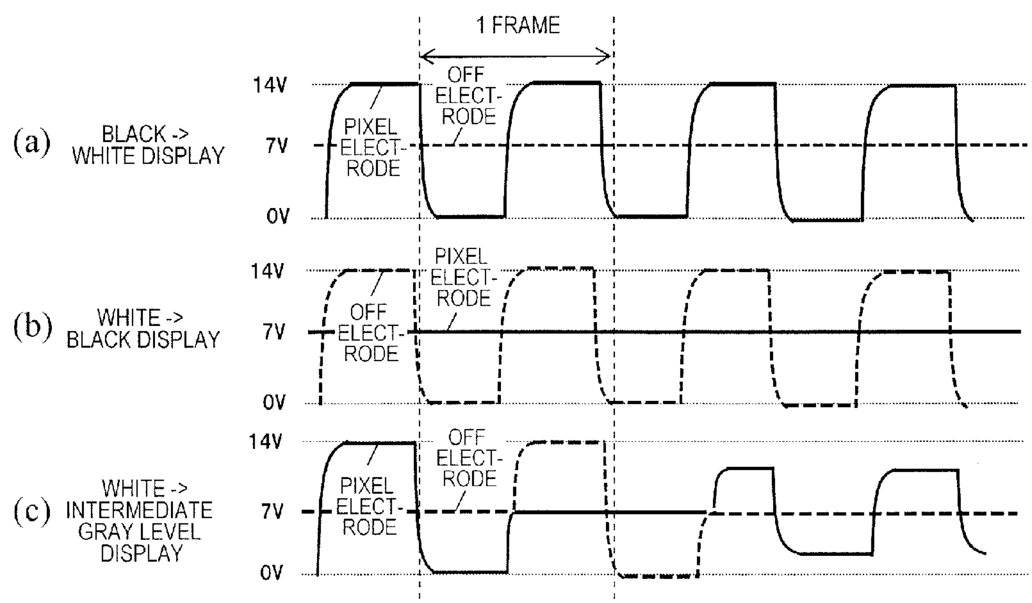
FIG. 6 (*a*), (*b*) and (*c*) are diagrams showing the potential of a first electrode (pixel electrode) 11 and the potential of a third electrode (OFF electrode) 13 when switching from the black display state to the white display state, when switching from the white display state to the black display state, and when switching from the white display state to an intermediate gray level display state, respectively.

Next, referring to FIG. 6, specific example potentials to be given to different electrodes will be described. FIGS. 6(*a*), 6(*b*) and 6(*c*) show the potentials of the first electrode (pixel electrode) 11 and the third electrode (OFF electrode) 13 when switching from the black display state to the white display state, when switching from the white display state to the black display state, and when switching from the white display state to an intermediate gray level display state, respectively. Note that although FIGS. 6(*a*), 6(*b*) and 6(*c*) show an example of driving at 120 Hz (driving at 2× speed), it is understood that the drive frequency is not limited thereto. In this example, a potential of 7 V is always given to the second electrode (first common electrode) 12 and the fourth electrode (second common electrode) 14.

As shown in FIG. 6(*a*), when switching from the black display state to the white display state, a potential that oscillates from 0 V to 14 V to 0 V, and so on, is given, as the white voltage (highest gray level voltage), to the first electrode 11, and a potential of 7 V is given to the third electrode 13.

As shown in FIG. 6(*b*), when switching from the white display state to the black display state, a potential of 7 V is given to the first electrode 11, and a potential that oscillates from 0 V to 14 V to 0 V, and so on, is given to the third electrode 13.

As shown in FIG. 6(*c*) (the white display state potential from immediately before the switching is shown in FIG. 6(*c*) over half a frame), when switching from the white display state to an intermediate gray level display state, the white voltage (a potential of 0 V) is given to the first electrode 11 and a potential of 7 V to the third electrode 13 in the first half of the first frame immediately after the switching, and a potential of 7 V is given to the first electrode 11 and a potential of 14 V to the third electrode 13 in the second half thereof. Then, in the first half of the next frame, a potential of 7 V continues to be given to the first electrode 11 and a potential of 0 V to the third electrode 13. Then, in and after the second half of the frame, an intermediate gray level voltage (a potential between 14 V and 7 V or a potential between 7 V to 0 V) is given to the first electrode 11 and a potential of 7 V to the third electrode 13.

As described above, with the liquid crystal display device 100 of the present embodiment, an electric field-induced torque acts upon the liquid crystal molecules 31 when switching from the black display state to the white display state and when switching from the white display state to the black display state (a torque from the fringe electric field FE and a torque from the lateral electric field LE, respectively). Therefore, both at rising edge and at falling edge, the response speed increases, improving the response characteristics.

Note that although FIG. 6 shows an example in which the effective voltage to be applied through the liquid crystal layer 30 is ±7 V in the black display state and in the white display state, it is understood that the applied voltage is not limited thereto. As the voltage to be applied through the liquid crystal layer 30 when displaying black increases, the intensity of the lateral electric field LE increases, thereby allowing for an increase in the response speed at falling edge.

(Embodiment 2)

Figure 7:
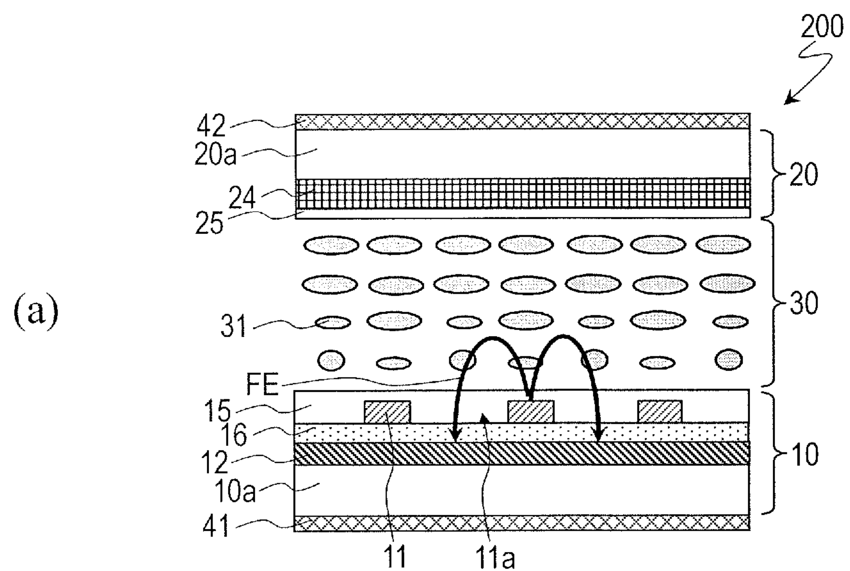
FIG. 7 (*a*) and (*b*) are cross-sectional views each schematically showing a liquid crystal display device 200 of an embodiment of the present invention, showing the alignment state of the liquid crystal molecules 31 when switching display from the black display state to the white display state and when switching display from the white display state to the black display state, respectively.
Figure 7:
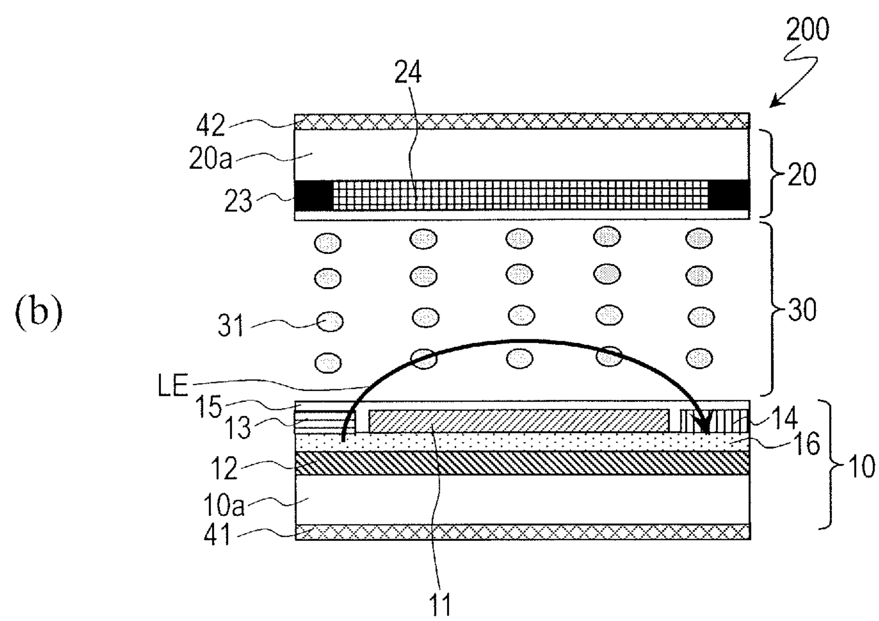

FIG. 7 shows a liquid crystal display device 200 of the present embodiment. FIGS. 7(*a*) and 7(*b*) are cross-sectional views schematically showing the liquid crystal display device 200, showing the alignment state of the liquid crystal molecules 31 when switching display from the black display state to the white display state and when switching display from the white display state to the black display state, respectively. That is, FIGS. 7(*a*) and 7(*b*) correspond to FIG. 3(*a*) and FIG. 4(*a*), respectively, for the liquid crystal display device 100 of Embodiment 1.

With the liquid crystal display device 100 of Embodiment 1, two insulating layers (the first insulating layer 16 and the second insulating layer 17) are provided between the first electrode 11 and the second electrode 12, and the third electrode 13 and the fourth electrode 14 are provided between the first insulating layer 16 and the second insulating layer 17.

In contrast, with the liquid crystal display device 200 of the present embodiment, only one insulating layer (only the first insulating layer 16) is provided between the first electrode 11 and the second electrode 12, and the third electrode 13 and the fourth electrode 14 is provided in the same layer (on the same level) as the first electrode 12. That is, the third electrode 13 and the fourth electrode 14 are provided, together with the first electrode 11, on the first insulating layer 16, and are typically formed from the same conductive film (i.e., in the same step using the same transparent conductive material) as the first electrode 11.

Also with the liquid crystal display device 200 of the present embodiment, the fringe electric field FE is produced through the liquid crystal layer 30 by the first electrode (pixel electrode) 11 and the second electrode (first common electrode) 12 when displaying white as shown in FIG. 7(*a*), and the lateral electric field LE is produced through the liquid crystal layer 30 by the third electrode (OFF electrode) 13 and the fourth electrode (second common electrode) 14 when displaying black as shown in FIG. 7(*b*). Therefore, the response characteristics improve not only at rising edge but also at falling edge.

It is possible to reduce the number of manufacturing steps by employing a configuration in which only one insulating layer (the first insulating layer 16) is provided between the first electrode 11 and the second electrode 12, and the third electrode 13 and the fourth electrode 14 are provided in the same layer as the first electrode 12, as in the present embodiment.

On the other hand, the effect of improving the response characteristics at falling edge is pronounced by employing a configuration in which the third electrode 13 and the fourth electrode 14 are provided between the first insulating layer 16 and the second insulating layer 17, as with the liquid crystal display device 100 of Embodiment 1. This is for the following reason. When the third electrode 13 and the fourth electrode 14 are provided in the same layer as the first electrode 11, the potential of the first electrode (pixel electrode) 11 and the potential of the fourth electrode (second common electrode) 14 are equal to each other when displaying black, thereby narrowing the width of the area in which the lateral electric field is effectively applied. In contrast, when the third electrode 13 and the fourth electrode 14 are provided between the first insulating layer 16 and the second insulating layer 17 (i.e., in a separate layer from the first electrode 11), the width of the area in which the lateral electric field is effectively applied is not narrowed even if the potential of the first electrode (pixel electrode) 11 and the potential of the fourth electrode (second common electrode) 14 are equal to each other when displaying black, making it possible to more effectively bring the liquid crystal molecules 31 back to the initial alignment azimuthal direction D.

(Embodiment 3)

Figure 8:
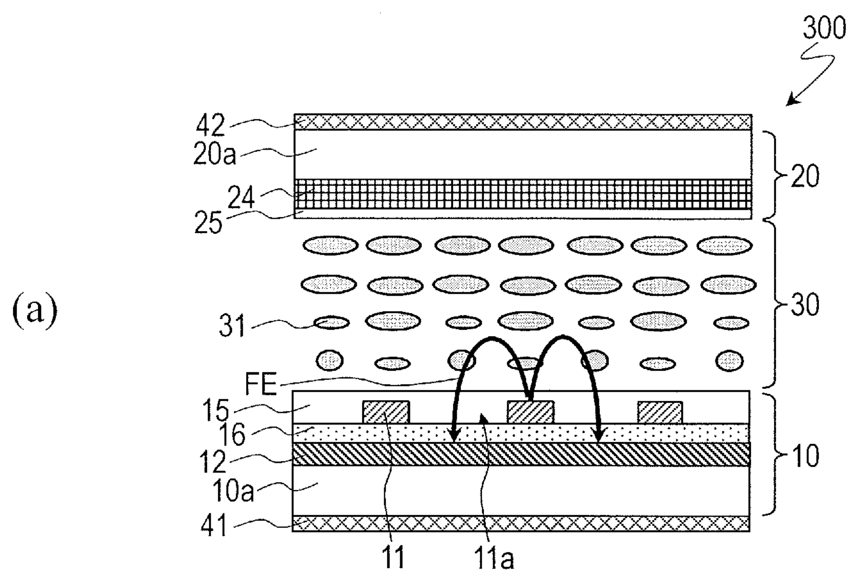
FIG. 8 (*a*) and (*b*) are cross-sectional views each schematically showing a liquid crystal display device 300 of an embodiment of the present invention, showing the alignment state of the liquid crystal molecules 31 when switching display from the black display state to the white display state and when switching display from the white display state to the black display state, respectively.
Figure 8:
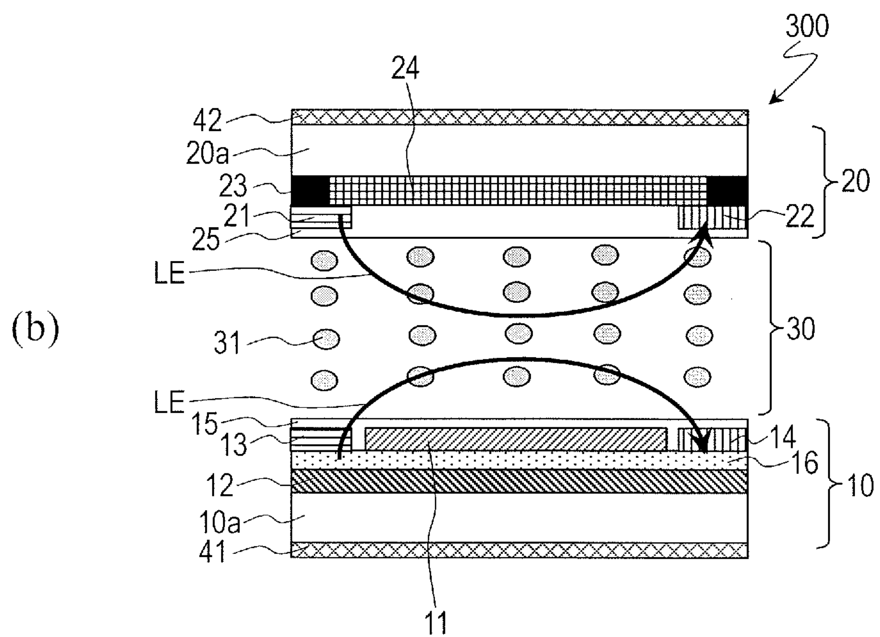

FIG. 8 shows a liquid crystal display device 300 of the present embodiment. FIGS. 8(*a*) and 8(*b*) are cross-sectional views schematically showing the liquid crystal display device 300, showing the alignment state of the liquid crystal molecules 31 when switching display from the black display state to the white display state and when switching display from the white display state to the black display state, respectively. That is, FIGS. 8(*a*) and 8(*b*) correspond to FIGS. 7(*a*) and 7(*b*), respectively, for the liquid crystal display device 200 of Embodiment 2.

The liquid crystal display device 300 of the present embodiment is different from the liquid crystal display device 200 of Embodiment 2 in that the second substrate 20 includes a fifth electrode 21 and a sixth electrode 22 (the third electrode pair), which are capable of producing the lateral electric field LE.

Each of the fifth electrode 21 and the sixth electrode 22 has an elongate shape (strip shape), and extends generally parallel to the initial alignment azimuthal direction D (i.e., generally parallel to the longitudinal direction of the pixels). That is, the fifth electrode 21 and the sixth electrode 22 extend in the same direction as the third electrode 13 and the fourth electrode 14. Therefore, the lateral electric field LE produced by the fifth electrode 21 and the sixth electrode 22 aligns the liquid crystal molecules 31 in the initial alignment azimuthal direction D. Herein, the fifth electrode 21 receives the same voltage as that for the third electrode 13, and the sixth electrode 22 receives the same voltage as that for the fourth electrode 14. That is, the fifth electrode 21 and the sixth electrode 22 are driven in sync with the third electrode 13 and the fourth electrode 14, and the fifth electrode 21 and the sixth electrode 22 function as the “OFF electrode” and the “second common electrode”, respectively. The fifth electrode 21 and the sixth electrode 22 may be formed from a transparent conductive material such as ITO, or from a metal material.

As described above, with the liquid crystal display device 300 of the present embodiment, the active matrix substrate 10 includes the third electrode 13 and the fourth electrode 14, which are capable of producing the lateral electric field LE, and the counter substrate 20 includes the fifth electrode 21 and the sixth electrode 22, which are capable of producing the lateral electric field LE, as are the third electrode 13 and the fourth electrode 14. By employing such a configuration, it is possible to quickly align more liquid crystal molecules 31 (not only those in the vicinity of the active matrix substrate 10, but also those in the vicinity of the counter substrate 20) in the initial alignment azimuthal direction D, thus further improving the response characteristics at falling edge.

(Embodiment 4)

Figure 9:
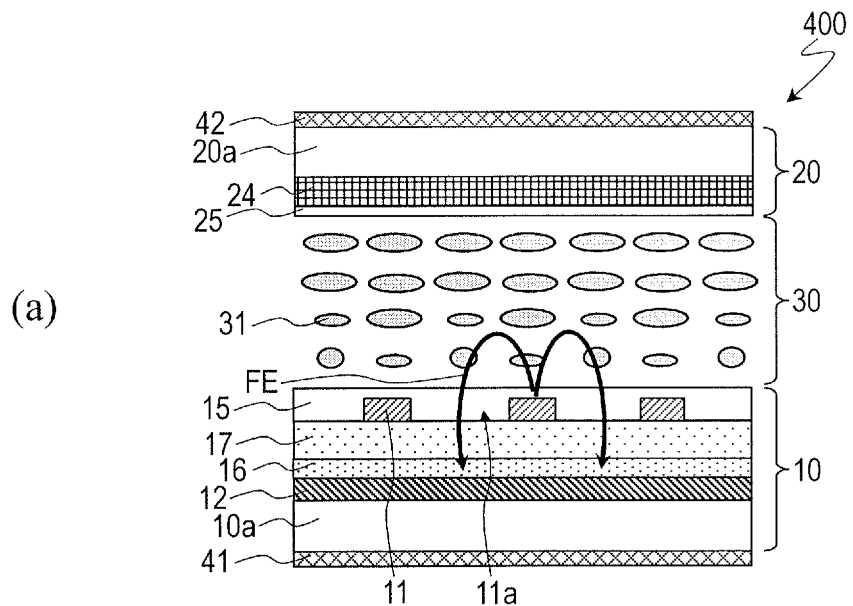
FIG. 9 (*a*) and (*b*) are cross-sectional views each schematically showing a liquid crystal display device 400 of an embodiment of the present invention, showing the alignment state of the liquid crystal molecules 31 when switching display from the black display state to the white display state and when switching display from the white display state to the black display state, respectively.
Figure 9:
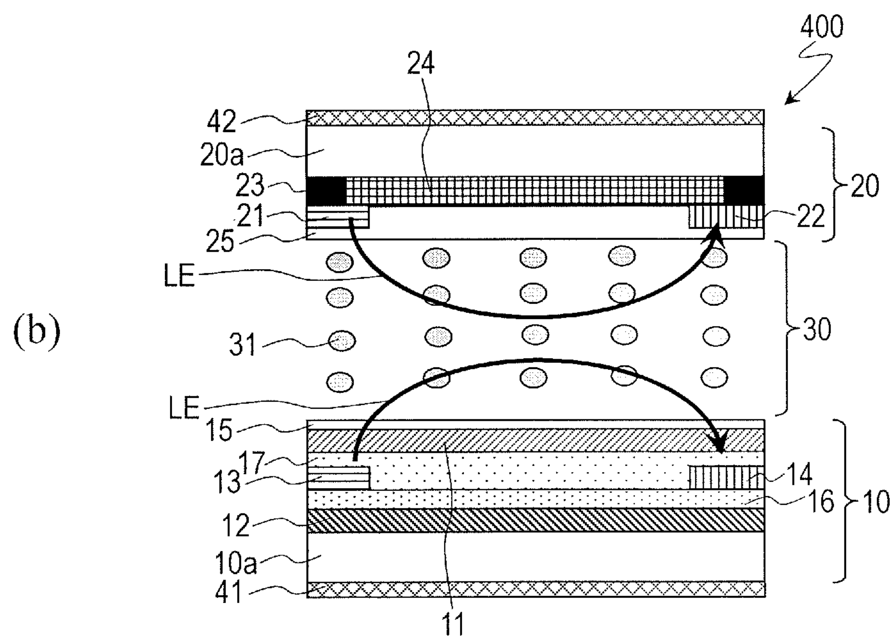

FIG. 9 shows a liquid crystal display device 400 of the present embodiment. FIGS. 9(*a*) and 9(*b*) are cross-sectional views schematically showing the liquid crystal display device 400, showing the alignment state of the liquid crystal molecules 31 when switching display from the black display state to the white display state and when switching display from the white display state to the black display state, respectively. That is, FIGS. 9(*a*) and 9(*b*) correspond to FIG. 3(*a*) and FIG. 4(*a*), respectively, for the liquid crystal display device 100 of Embodiment 1.

The liquid crystal display device 400 of the present embodiment is different from the liquid crystal display device 100 of Embodiment 1 in that the second substrate 20 includes a fifth electrode 21 and a sixth electrode 22 (the third electrode pair), which are capable of producing the lateral electric field LE.

Each of the fifth electrode 21 and the sixth electrode 22 has an elongate shape (strip shape), and extends generally parallel to the initial alignment azimuthal direction D (i.e., generally parallel to the longitudinal direction of the pixels). That is, the fifth electrode 21 and the sixth electrode 22 extend in the same direction as the third electrode 13 and the fourth electrode 14. Therefore, the lateral electric field LE produced by the fifth electrode 21 and the sixth electrode 22 aligns the liquid crystal molecules 31 in the initial alignment azimuthal direction D. Herein, the fifth electrode 21 receives the same voltage as that for the third electrode 13, and the sixth electrode 22 receives the same voltage as that for the fourth electrode 14. That is, the fifth electrode 21 and the sixth electrode 22 are driven in sync with the third electrode 13 and the fourth electrode 14, and the fifth electrode 21 and the sixth electrode 22 function as the “OFF electrode” and the “second common electrode”, respectively. The fifth electrode 21 and the sixth electrode 22 may be formed from a transparent conductive material such as ITO, or from a metal material.

As described above, with the liquid crystal display device 400 of the present embodiment, the active matrix substrate 10 includes the third electrode 13 and the fourth electrode 14, which are capable of producing the lateral electric field LE, and the counter substrate 20 includes the fifth electrode 21 and the sixth electrode 22, which are capable of producing the lateral electric field LE, as are the third electrode 13 and the fourth electrode 14. By employing such a configuration, it is possible to quickly align more liquid crystal molecules 31 (not only those in the vicinity of the active matrix substrate 10, but also those in the vicinity of the counter substrate 20) in the initial alignment azimuthal direction D, thus further improving the response characteristics at falling edge.

(Results of Testing Response Characteristics Improving Effect of Embodiments 1 to 4)

Now, for the liquid crystal display devices 100 to 400 of Embodiments 1 to 4 described above and a liquid crystal display device 1100 of Reference Example 1 shown in FIG. 10 and FIG. 11, the results of testing the effect of improving the response characteristics at falling edge will be discussed.

Figure 10:
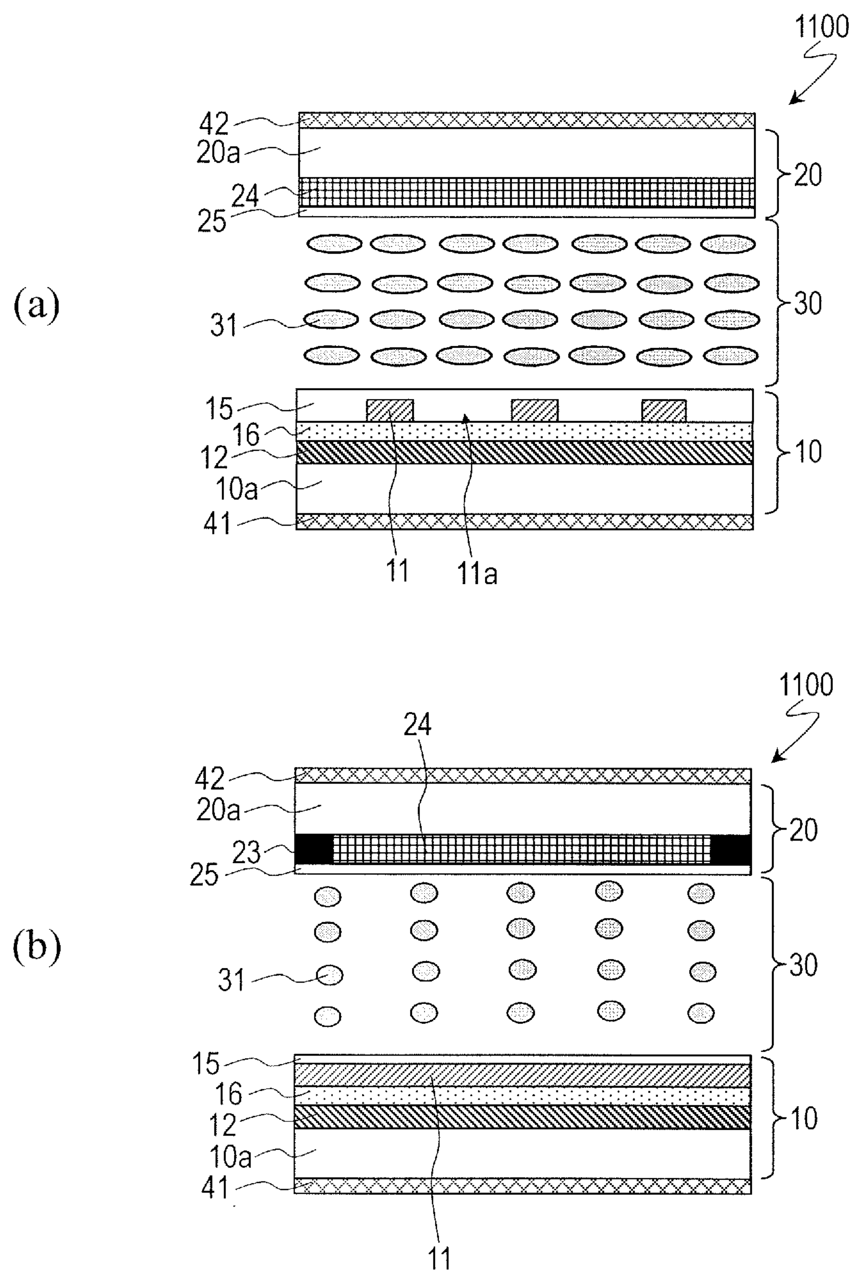
FIG. 10 (*a*) and (*b*) are cross-sectional views taken along line 10A-10A' and line 10B-10B', respectively, of FIG. 11, each schematically showing a liquid crystal display device 1100 of Reference Example 1.
Figure 11:
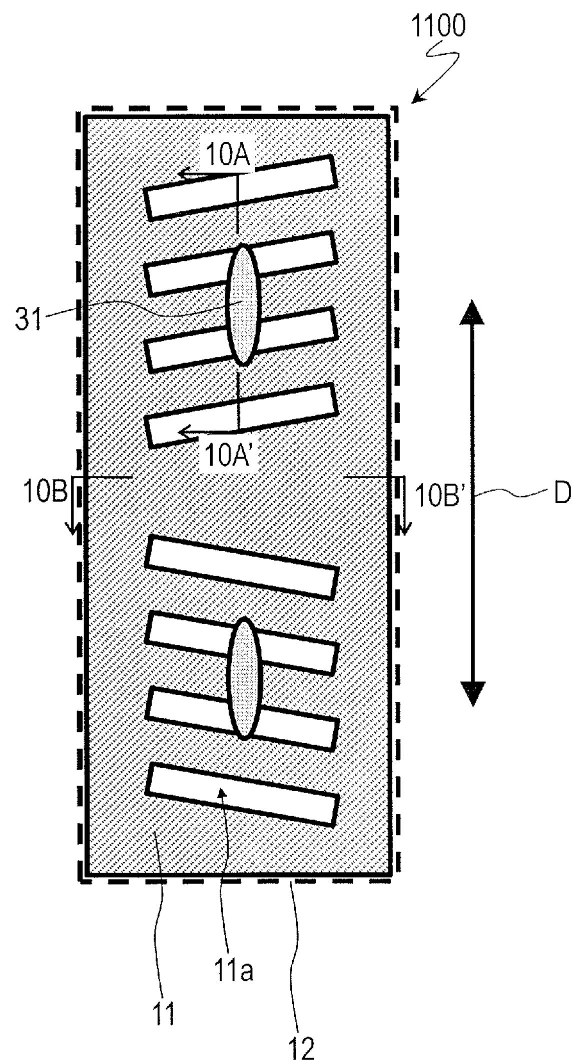
FIG. 11 A plan view schematically showing the liquid crystal display device 1100, showing a one-pixel region of the liquid crystal display device 1100.

First, the configuration of the liquid crystal display device 1100 of Reference Example 1 will be described. FIGS. 10(*a*)

and 10(*b*) are cross-sectional views schematically showing the liquid crystal display device 1100, and FIG. 11 is a plan view schematically showing the liquid crystal display device 1100. FIG. 11 shows a one-pixel region of the liquid crystal display device 1100, and FIGS. 10(*a*) and 10(*b*) show cross sections taken along line 10A-10A' and line 10B-10B', respectively, of FIG. 11. FIGS. 10(*a*) and 10(*b*) and FIG. 11 show a state in which no electric field is applied through the liquid crystal layer 30.

The liquid crystal display device 1100 of Reference Example 1 has the same configuration as that of the liquid crystal display device 200 of Embodiment 2 except that the liquid crystal display device 1100 does not include the third electrode 13 and the fourth electrode 14 as shown in FIGS. 10(*a*) and 10(*b*) and FIG. 11.

Figure 12:
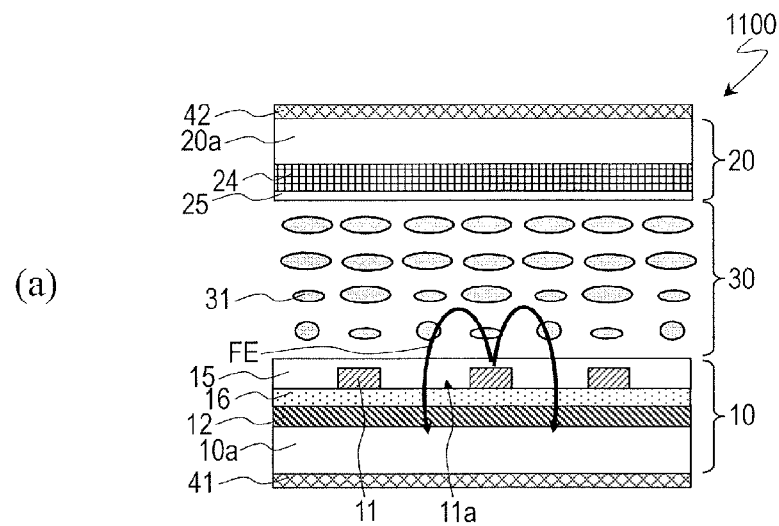
FIG. 12 (*a*) and (*b*) are a cross-sectional view and a plan view, respectively, schematically showing the alignment state of the liquid crystal molecules 31 when switching display from the black display state to the white display state on the liquid crystal display device 1100, wherein (a) shows a cross section taken along line 12A-12A' of (b).
Figure 12:
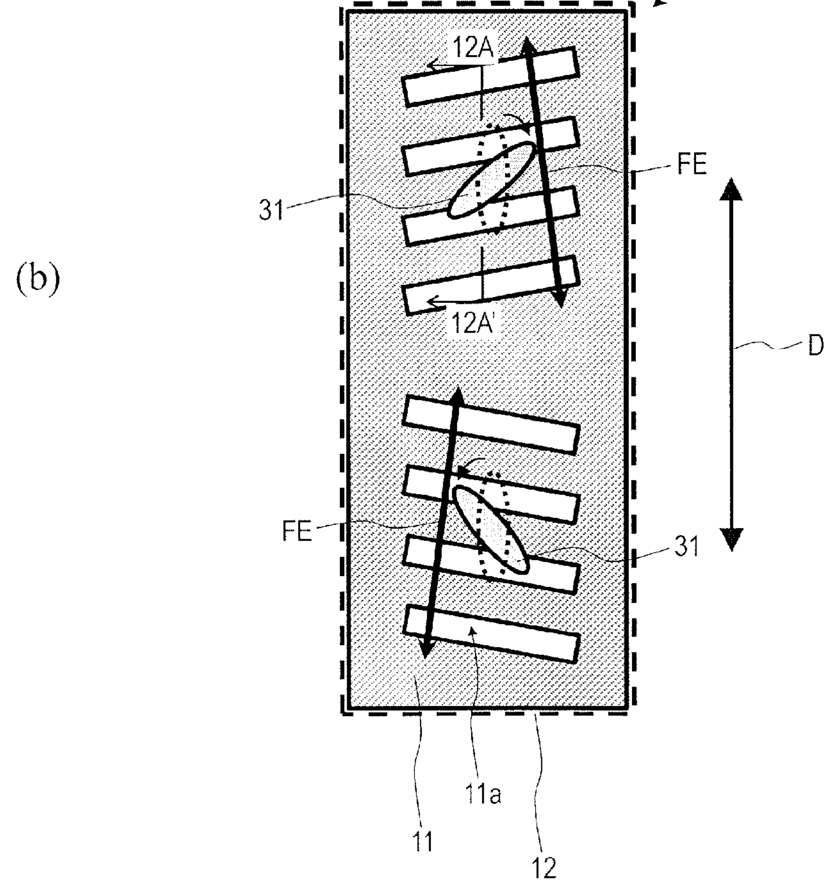

FIGS. 12(*a*) and 12(*b*) are a cross-sectional view and a plan view, respectively, schematically showing the alignment state of the liquid crystal molecules 31 when switching display from the black display state to the white display state on the liquid crystal display device 1100. FIG. 12(*a*) shows a cross section taken along line 12A-12A' of FIG. 12(*b*).

As shown in FIGS. 12(*a*) and 12(*b*), the fringe electric field FE is produced through the liquid crystal layer 30 by the first electrode 11 and the second electrode 12 when displaying white. The fringe electric field FE aligns the liquid crystal molecules 31 in an azimuthal direction that is different from the initial alignment azimuthal direction D. Specifically, as shown in FIG. 12(*b*), the liquid crystal molecules 31 rotate clockwise in the upper half of the pixel, and the liquid crystal molecules 31 rotate counterclockwise in the lower half of the pixel.

Figure 13:
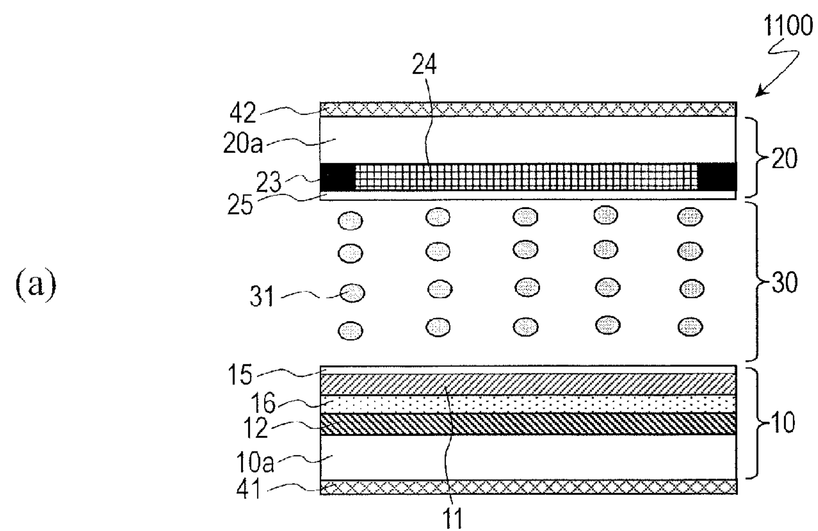
FIG. 13 (*a*) and (*b*) are a cross-sectional view and a plan view, respectively, schematically showing the alignment state of the liquid crystal molecules 31 when switching display from the white display state to the black display state on the liquid crystal display device 1100, wherein (a) shows a cross section taken along line 13A-13A' of (b).
Figure 13:
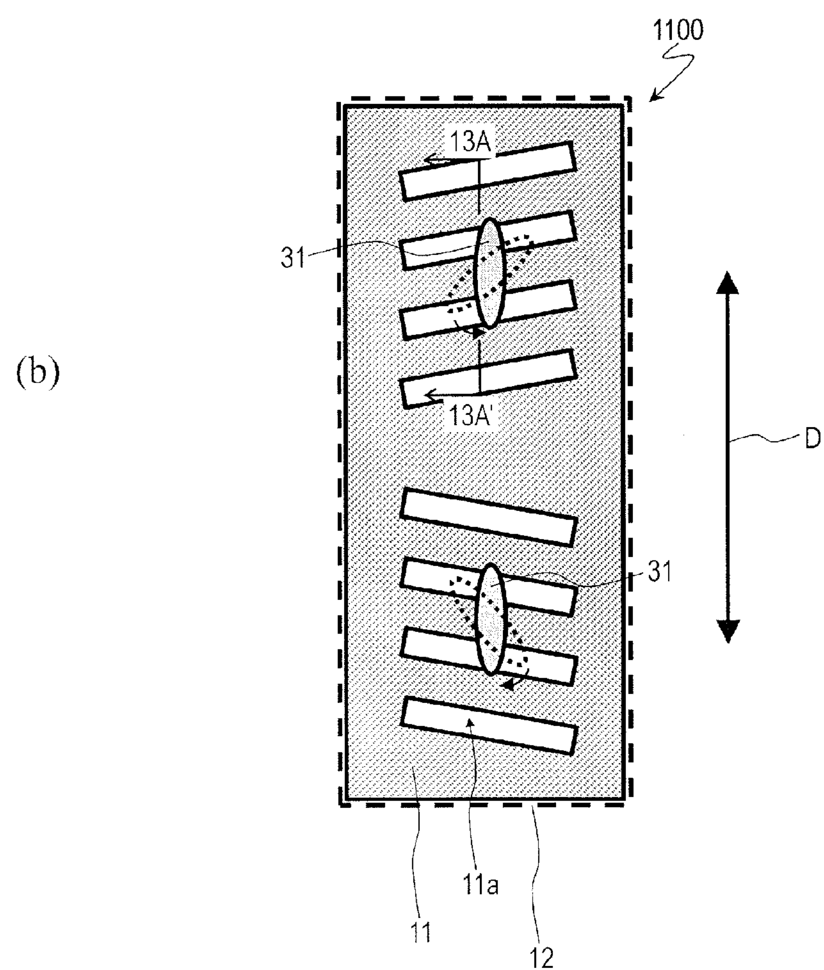

FIGS. 13(*a*) and 13(*b*) are a cross-sectional view and a plan view, respectively, schematically showing the alignment state of the liquid crystal molecules 31 when switching display from the white display state to the black display state on the liquid crystal display device 1100. FIG. 13(*a*) shows a cross section taken along line 13A-13A' of FIG. 13(*b*).

As shown in FIGS. 13(*a*) and 13(*b*), no electric field is produced through the liquid crystal layer 30 when displaying black. The liquid crystal molecules 31 change their alignment azimuthal direction to return to the initial alignment azimuthal direction D. The response speed (response time) depends on the elastic constant or the viscosity of the liquid crystal material.

Next, the test results will be discussed. The test was done by way of a simulation using LCD-Master 3D from Shintech, Inc. Cell parameters set for the simulation are as shown in Table 1 below. The cell parameters shown therein include the refractive index anisotropy Δn, the dielectric constant anisotropy Δ∈ and the viscosity of the liquid crystal material, the retardation Re of the liquid crystal layer 30, the azimuthal direction in which the slits 11*a* of the pixel electrode 11 extend, the initial alignment azimuthal direction D of the liquid crystal molecules 31, and the interval L and the width S of the slits 11*a* of the pixel electrode 11. Note that the values of the azimuthal direction in which the slits 11*a* extend and the initial alignment azimuthal direction D of the liquid crystal molecules 31 are defined with 0° being the 3 o'clock direction on the display surface seen as a clockface. Table 1 also shows the number and position of electrode pairs capable of producing the lateral electric field LE.

TABLE 1

| | | | Reference | Embodiments | | | |
|---|---|---|---|---|---|---|---|
| | | | Example 1 | 1 | 2 | 3 | 4 |
| Liquid crystal material | Refractive index anisotropy Δn | | | | 0.1 | | |
| | Dielectric constant anisotropy Δϵ | | | | −3.6 | | |
| | Viscosity | | | | 120 cps | | |
| Retardation of liquid crystal layer Re | | | | | 340 nm | | |
| Azimuthal direction of slits | | | | | 0 ± 10° | | |
| Initial alignment azimuthal direction | | | | | 90° | | |
| L/S | | | | | 3/4 μm | | |
| Electrode pair producing transverse electric field | Number | | 0 | 1 | 1 | 2 | 2 |
| | Position | Counter substrate side | Absent | Absent | Absent | Present | Present |
| | | Same layer as pixel electrode | Absent | Absent | Present | Present | Absent |
| | | Between pixel electrode and counter electrode | Absent | Present | Absent | Absent | Present |

Figure 14:
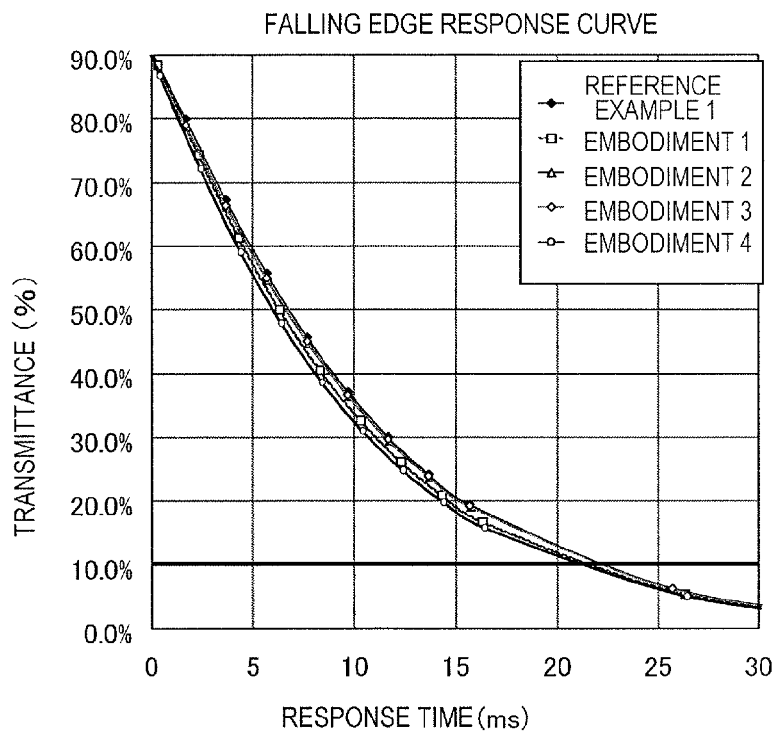
FIG. 14 (*a*) is a graph showing falling edge response curves of the liquid crystal display devices 100 to 400 of Embodiments 1 to 4 and the liquid crystal display device 1100 of Reference Example 1, and (b) is a graph showing, on an enlarged scale, a part of (a) in the vicinity of 10% transmittance.
Figure 14:
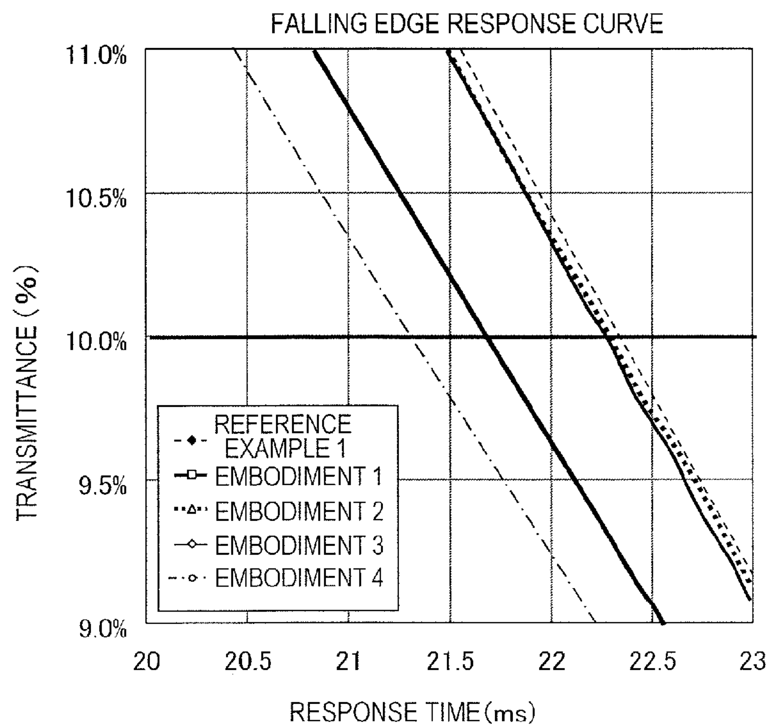

FIG. 14(*a*) is a graph showing the falling edge response curves of the liquid crystal display devices 100 to 400 of Embodiments 1 to 4 and the liquid crystal display device 1100 of Reference Example 1. The horizontal axis of FIG. 14(*a*) (the response time) is defined with zero being the point in time when transmittance becomes 90% after a predetermined voltage is applied between the third electrode 13 and the fourth electrode 14 (needless to say, the voltage between the first electrode 11 and the second electrode 12 is OFF) from the white display state (100% transmittance) for the liquid crystal display devices 100 to 400 of Embodiments 1 to 4, and is defined with zero being the point in time when transmittance becomes 90% after the voltage between the first electrode 11 and the second electrode 12 is turned OFF from the white display state for the liquid crystal display device 1100 of Reference Example 1. FIG. 14(*b*) is a graph showing, on an enlarged scale, a part of FIG. 14(*a*) in the vicinity of 10% transmittance (on the vertical axis).

It can be seen from FIGS. 14(*a*) and 14(*b*) that transmittance decreases more quickly, indicating better response characteristics at falling edge, for the liquid crystal display devices 100 to 400 of Embodiments 1 to 4 than for the liquid crystal display device 1100 of Reference Example 1. Table 2 below shows the response time at falling edge (the amount of time taken for transmittance to change from 90% to 10%) for the liquid crystal display devices 100 to 400 of Embodiments 1 to 4 and for the liquid crystal display device 1100 of Reference Example 1.

TABLE 2

| | Reference | Embodiments | | | |
|---|---|---|---|---|---|
| | Example 1 | 1 | 2 | 3 | 4 |
| Falling edge response time [ms] | 22.3 | 21.7 | 22.2 | 22.2 | 21.3 |

As can be seen from Table 2, the response time at falling edge is shorter for any of the liquid crystal display devices 100 to 400 of Embodiments 1 to 4 than for the liquid crystal display device 1100 of Reference Example 1.

Thus, the liquid crystal display devices 100 to 400 of Embodiments 1 to 4 have improved response characteristics at falling edge. This is because during response at falling edge, the liquid crystal molecules 31 are forced back to the initial alignment azimuthal direction by the lateral electric field LE produced by the third electrode 13 and the fourth electrode 14.

In contrast, with an ordinary liquid crystal display device such as the liquid crystal display device 1100 of Reference Example 1, since no electric field is applied through the liquid crystal layer at falling edge response (OFF response), the liquid crystal molecules return to the initial alignment azimuthal direction through the liquid crystal relaxation phenomenon. Thus, the response time is significantly dependent on the viscosity of the liquid crystal material. Particularly, the falling edge response time becomes longer as the temperature lowers and the viscosity increases.

On the other hand, with the liquid crystal display devices 100 to 400 of Embodiments 1 to 4, the liquid crystal molecules 31 are returned to the initial alignment azimuthal direction D by having the lateral electric field LE acting upon the liquid crystal molecules 31 at falling edge response, making it possible to realize sufficient response characteristics even when the viscosity of the liquid crystal material increases at a low temperature. It is possible to improve the response characteristics by having a period in which the lateral electric field LE is applied through the liquid crystal layer 30 and a period in which the fringe electric field FE is applied therethrough both within one frame (within one vertical scanning period), as shown in FIG. 6(*c*), not only when switching from the white display state to the black display state but also when switching from the white display state to an intermediate gray level display state (or when switching from an intermediate gray level display state of a relatively high gray level to another intermediate gray level display state of a relatively low gray level). Therefore, it is possible to improve the response characteristics when switching display between any gray levels.

(Embodiment 5)

Figure 15:
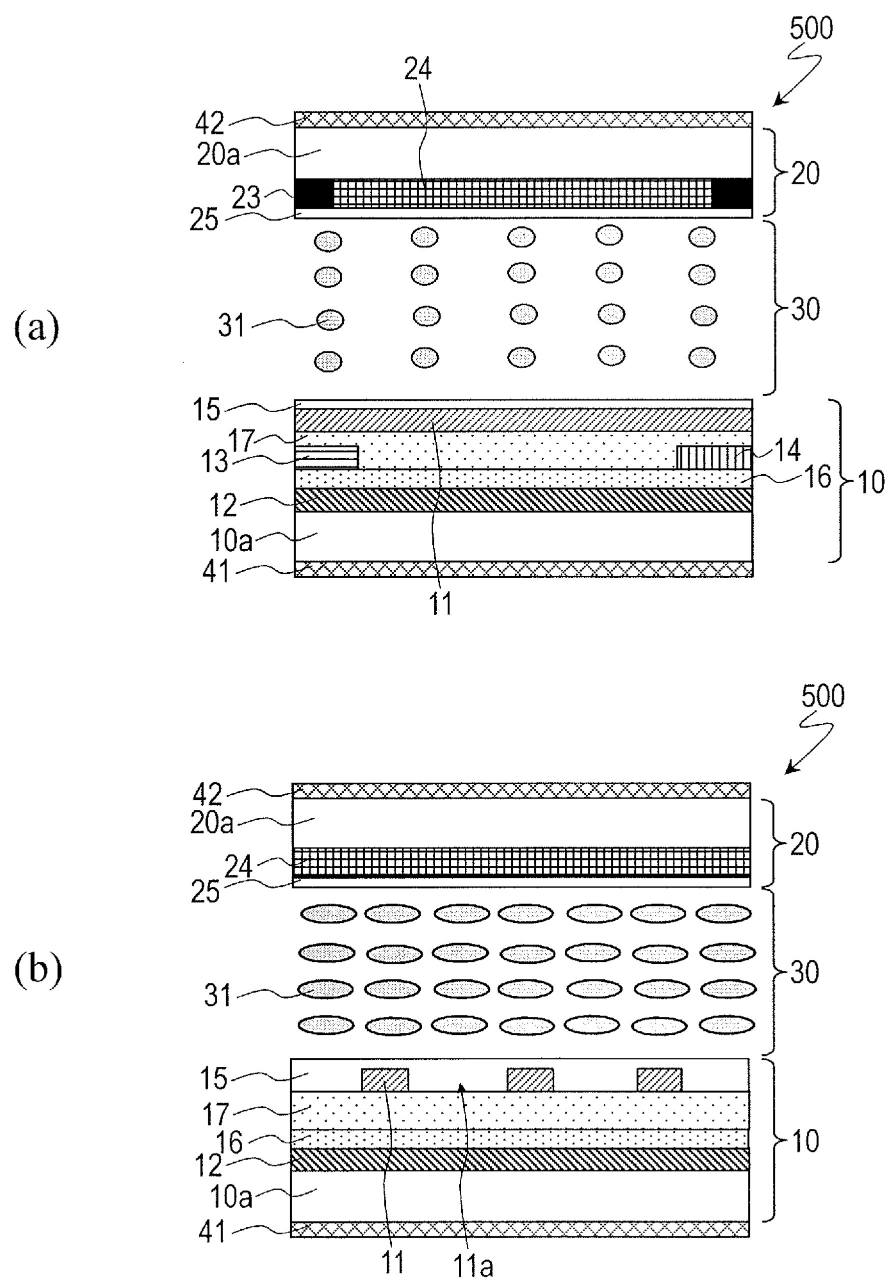
FIG. 15 (*a*) and (*b*) are cross-sectional views taken along line 15A-15A' and line 15B-15B', respectively, of FIG. 16, each schematically showing a liquid crystal display device 500 of an embodiment of the present invention.
Figure 16:
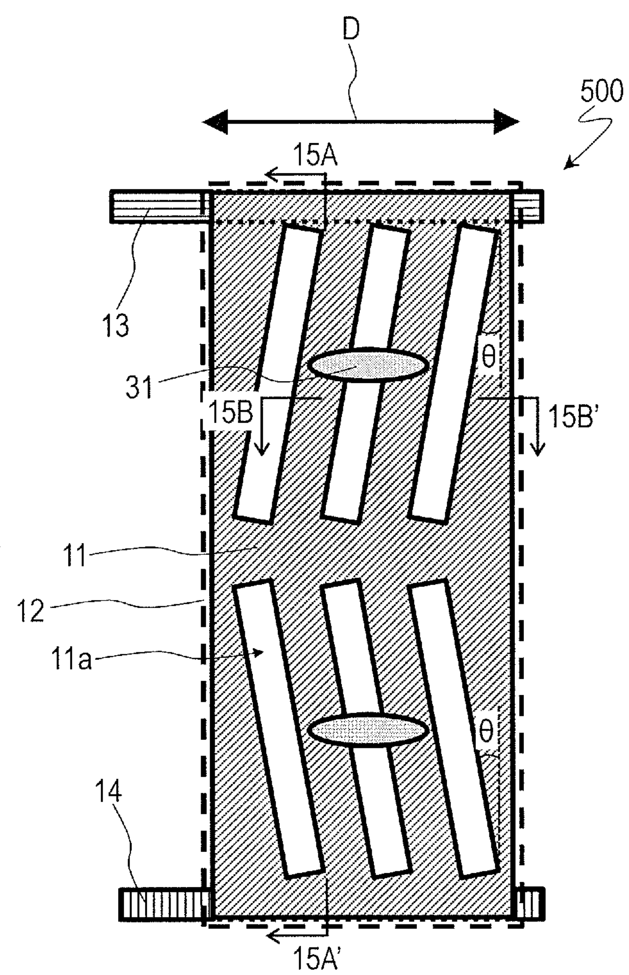
FIG. 16 A plan view schematically showing the liquid crystal display device 500, showing a one-pixel region of the liquid crystal display device 500.

FIG. 15 and FIG. 16 show a liquid crystal display device 500 of the present embodiment. FIGS. 15(*a*) and 15(*b*) are cross-sectional views schematically showing the liquid crystal display device 500, and FIG. 16 is a plan view schematically showing the liquid crystal display device 500. FIG. 16 shows a one-pixel region of the liquid crystal display device 500, and FIGS. 15(*a*) and 15(*b*) show cross sections taken along line 15A-15A' and line 15B-15B', respectively, of FIG. 16. FIGS. 15(*a*) and 15(*b*) and FIG. 16 show a state in which no electric field is applied through the liquid crystal layer 30.

With the liquid crystal display device 100 of Embodiment 1, the directions in which the third electrode and the fourth electrode 14 extend and the initial alignment azimuthal direction D of the liquid crystal molecules 31 are generally parallel to the longitudinal direction of the pixels. In contrast, with the liquid crystal display device 500 of the present embodiment, the directions in which the third electrode 13 and the fourth electrode 14 extend and the initial alignment azimuthal direction D of the liquid crystal molecules 31 are generally parallel to the width direction of the pixels (herein, the horizontal direction on the display surface), as shown in FIGS. 15(*a*) and 15(*b*) and FIG. 16.

The slits 11*a* of the first electrode 11 of the liquid crystal display device 500 extend in a direction that crosses the initial alignment azimuthal direction D. In the example shown in FIG. 16, the slits 11*a* formed in the upper half of the pixel and the slits 11*a* formed in the lower half of the pixel extend in directions different from each other. Specifically, with respect to the direction perpendicular to the initial alignment azimuthal direction D (the vertical direction on the display surface), the slits 11*a* in the upper half of the pixel are inclined clockwise by a predetermined angle θ, and the slits 11*a* in the lower half of the pixel are inclined counterclockwise by the predetermined angle θ. The angle θ is 10°, for example, but it is understood that the angle θ is not limited thereto.

Figure 17:
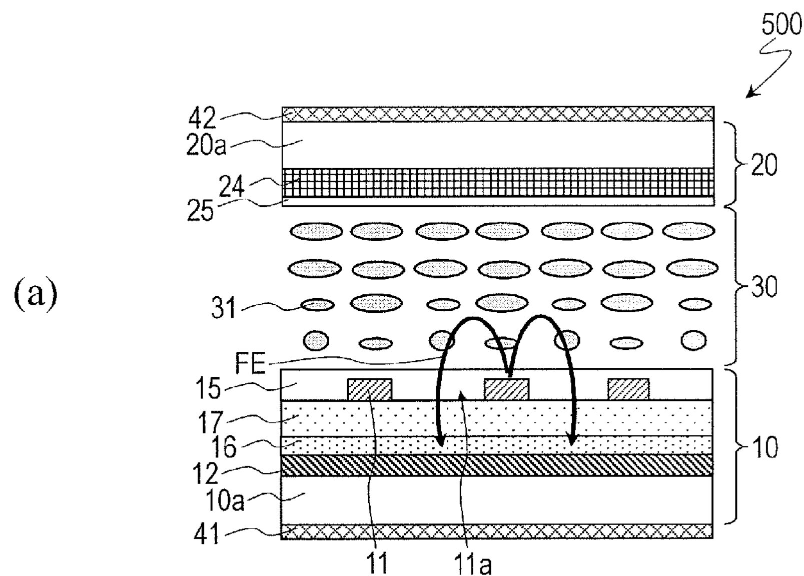
FIG. 17 (*a*) and (*b*) are a cross-sectional view and a plan view, respectively, schematically showing the alignment state of the liquid crystal molecules 31 when switching display from the black display state to the white display state on the liquid crystal display device 500, wherein (a) shows a cross section taken along line 17A-17A' of (b).
Figure 17:
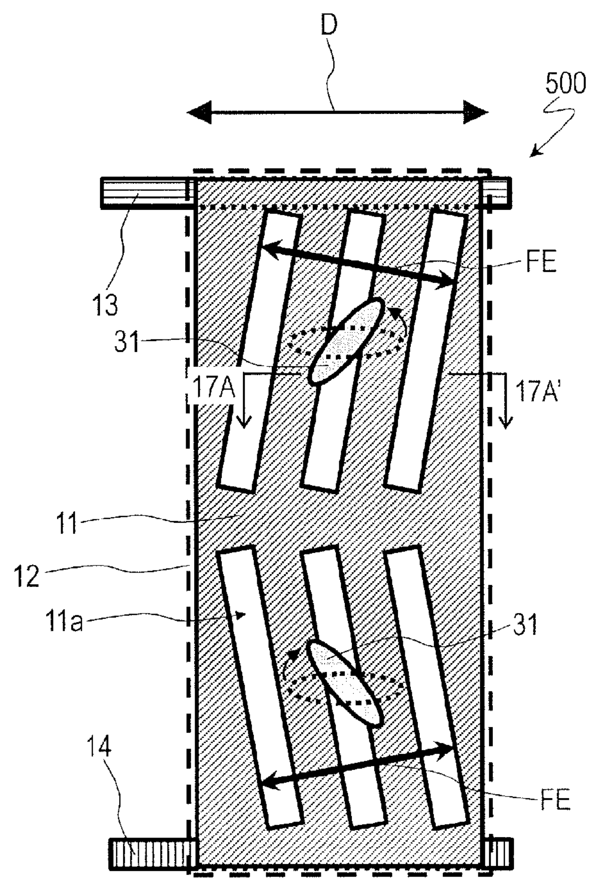
Figure 18:
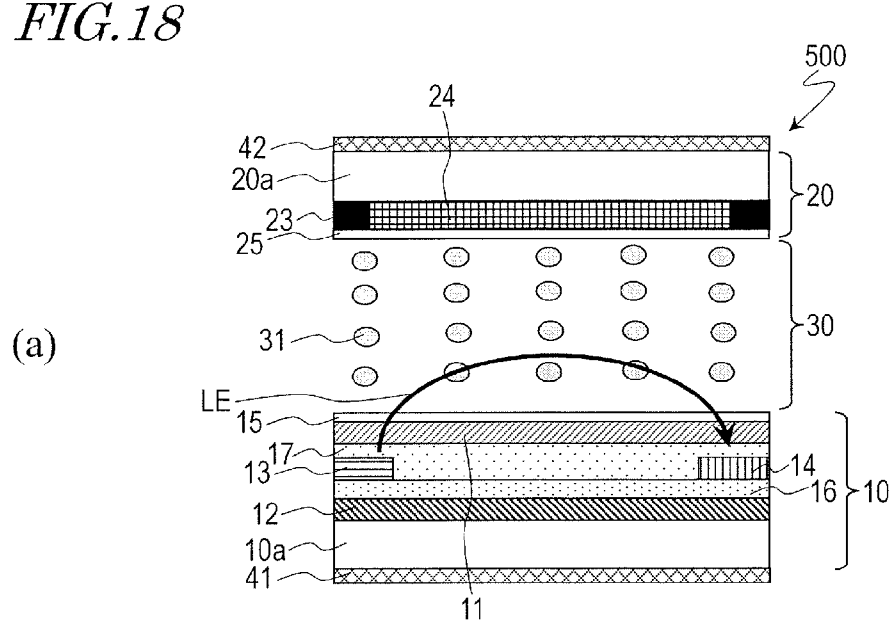
FIG. 18 (*a*) and (*b*) are a cross-sectional view and a plan view, respectively, schematically showing the alignment state of the liquid crystal molecules 31 when switching display from the white display state to the black display state on the liquid crystal display device 500, wherein (a) shows a cross section taken along line 18A-18A' of (b).
Figure 18:
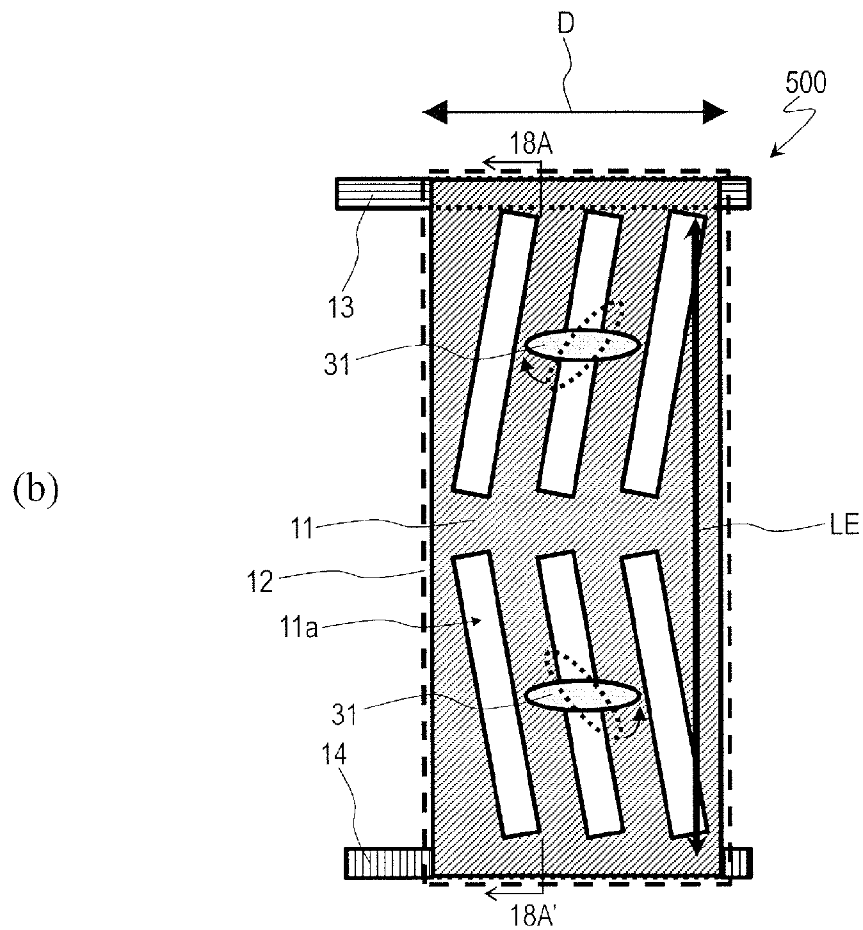

Also with the liquid crystal display device 500 of the present embodiment, a fringe electric field is produced by the first electrode (pixel electrode) 11 and the second electrode (first common electrode) 12 when displaying white, and a lateral electric field is produced by the third electrode (OFF electrode) 13 and the fourth electrode (second common electrode) 14 when displaying black. Referring to FIG. 17 and FIG. 18, the change of alignment when displaying white and that when displaying black will now be described.

FIGS. 17(*a*) and 17(*b*) are a cross-sectional view and a plan view, respectively, schematically showing the alignment state of the liquid crystal molecules 31 when switching display from the black display state to the white display state. FIG. 17(*a*) shows a cross section taken along line 17A-17A' of FIG. 17(*b*).

As shown in FIGS. 17(*a*) and 17(*b*), when displaying white, a fringe electric field FE is produced through the liquid crystal layer 30 by the first electrode and the second electrode 12, which are provided in different layers (at different levels) from each other. The direction of the fringe electric field FE as seen from the display surface normal direction is perpendicular to the direction in which the slits 11*a* of the first electrode 11 extend, thus exerting a torque on the liquid crystal molecules 31 such that the alignment direction thereof changes toward an azimuthal direction that is perpendicular to the direction of the fringe electric field FE. Therefore, as shown in FIG. 17(*b*), the liquid crystal molecules 31 rotate counterclockwise in the upper half of the pixel, and the liquid crystal molecules 31 rotate clockwise in the lower half of the pixel. Thus, the fringe electric field FE produced by the first electrode 11 and the second electrode 12 aligns the liquid crystal molecules 31 in an azimuthal direction that is different from the initial alignment azimuthal direction D.

FIGS. 18(*a*) and 18(*b*) are a cross-sectional view and a plan view, respectively, schematically showing the alignment state of the liquid crystal molecules 31 when switching display from the white display state to the black display state. FIG. 18(*a*) shows a cross section taken along 18A-18A' of FIG. 18(*b*).

As shown in FIGS. 18(*a*) and 18(*b*), when displaying black, a lateral electric field LE is produced through the liquid crystal layer 30 by the third electrode 13 and the fourth electrode 14, which are provided in the same layer (on the same level). The direction of the lateral electric field LE as seen from display surface normal direction is perpendicular to the direction in which the third electrode 13 and the fourth electrode 14 extend, thus exerting a torque on the liquid crystal molecules 31 such that the alignment direction thereof changes toward an azimuthal direction that is perpendicular to the direction of the lateral electric field LE (herein, the horizontal direction on the display surface). Therefore, as shown in FIG. 18(*b*), the liquid crystal molecules 31 rotate clockwise in the upper half of the pixel, and the liquid crystal molecules 31 rotate counterclockwise in the lower half of the pixel. Thus, the lateral electric field LE produced by the third electrode 13 and the fourth electrode 14 aligns the liquid crystal molecules 31 in the initial alignment azimuthal direction D.

As described above, with the liquid crystal display device 500 of the present embodiment, an electric field-induced torque acts upon the liquid crystal molecules 31 when switching from the black display state to the white display state and when switching from the white display state to the black display state (a torque from the fringe electric field FE and a torque from the lateral electric field LE, respectively). Therefore, both at rising edge and at falling edge, the response speed increases, improving the response characteristics.

(Embodiment 6)

Figure 19:
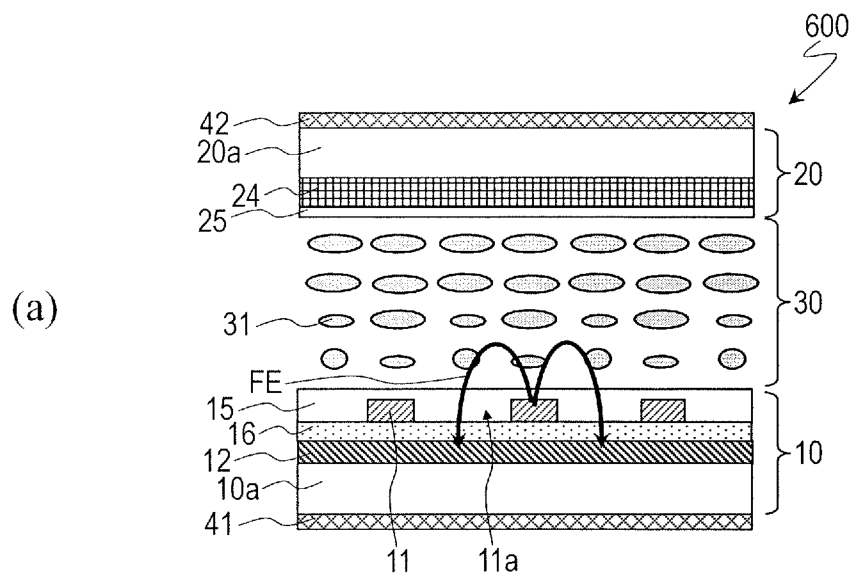
FIG. 19 (*a*) and (*b*) are cross-sectional views each schematically showing a liquid crystal display device 600 of an embodiment of the present invention, showing the alignment state of the liquid crystal molecules 31 when switching display from the black display state to the white display state and when switching display from the white display state to the black display state, respectively.
Figure 19:
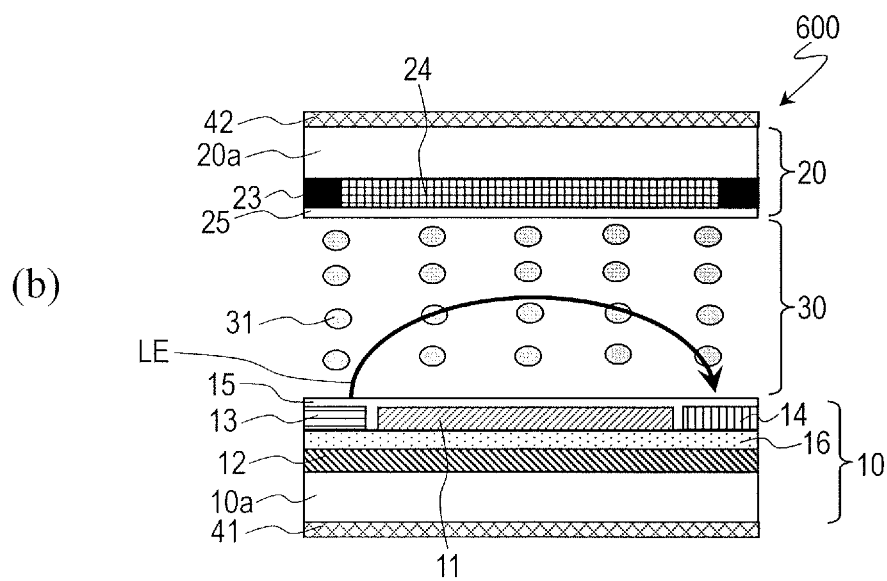

FIG. 19 shows a liquid crystal display device 600 of the present embodiment. FIGS. 19(*a*) and 19(*b*) are cross-sectional views schematically showing the liquid crystal display device 600, showing the alignment state of the liquid crystal molecules 31 when switching display from the black display state to the white display state and when switching display from the white display state to the black display state, respectively. That is, FIGS. 19(*a*) and 19(*b*) correspond to FIG. 17(*a*) and FIG. 18(*a*), respectively, for the liquid crystal display device 500 of Embodiment 5.

With the liquid crystal display device 500 of Embodiment 5, two insulating layers (the first insulating layer 16 and the second insulating layer 17) are provided between the first electrode 11 and the second electrode 12, and the third electrode 13 and the fourth electrode 14 are provided between the first insulating layer 16 and the second insulating layer 17.

In contrast, with the liquid crystal display device 600 of the present embodiment, only one insulating layer (only the first insulating layer 16) is provided between the first electrode 11 and the second electrode 12, and the third electrode 13 and the fourth electrode 14 is provided in the same layer (on the same level) as the first electrode 12. That is, the third electrode 13 and the fourth electrode 14 are provided, together with the first electrode 11, on the first insulating layer 16, and are typically formed from the same conductive film (i.e., in the same step using the same transparent conductive material) as the first electrode 11.

Also with the liquid crystal display device 600 of the present embodiment, the fringe electric field FE is produced through the liquid crystal layer 30 by the first electrode (pixel electrode) 11 and the second electrode (first common electrode) 12 when displaying white as shown in FIG. 19(*a*), and the lateral electric field LE is produced through the liquid crystal layer 30 by the third electrode (OFF electrode) 13 and the fourth electrode (second common electrode) 14 when displaying black as shown in FIG. 19(*b*). Therefore, the response characteristics improve not only at rising edge but also at falling edge.

It is possible to reduce the number of manufacturing steps by employing a configuration in which only one insulating layer (the first insulating layer 16) is provided between the first electrode 11 and the second electrode 12, and the third electrode 13 and the fourth electrode 14 are provided in the same layer as the first electrode 12, as in the present embodiment.

On the other hand, the effect of improving the response characteristics at falling edge is even more pronounced by employing a configuration in which the third electrode 13 and the fourth electrode 14 are provided between the first insulating layer 16 and the second insulating layer 17, as with the liquid crystal display device 500 of Embodiment 5, for the same reason as that set forth above in conjunction with the liquid crystal display device 100 of Embodiment 1.

(Embodiment 7)

Figure 20:
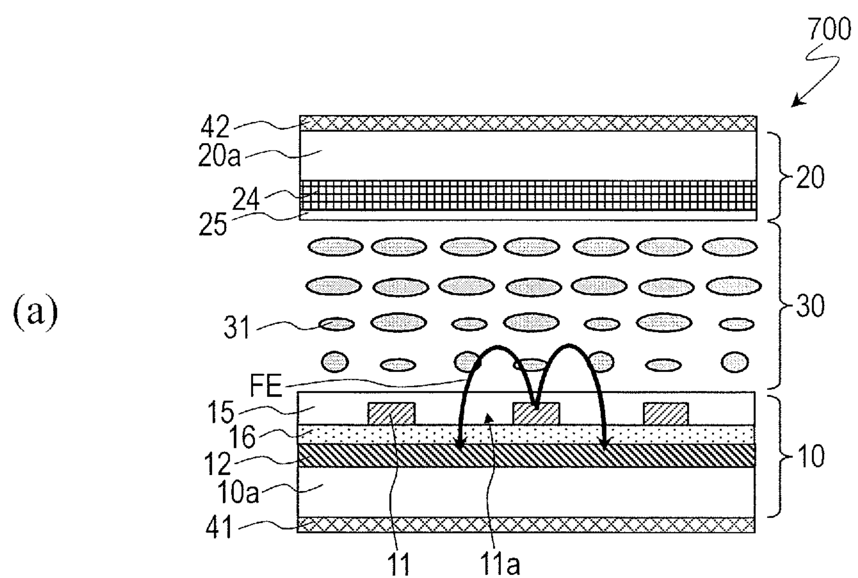
FIG. 20 (*a*) and (*b*) are cross-sectional views each schematically showing a liquid crystal display device 700 of an embodiment of the present invention, showing the alignment state of the liquid crystal molecules 31 when switching display from the black display state to the white display state and when switching display from the white display state to the black display state, respectively.
Figure 20:
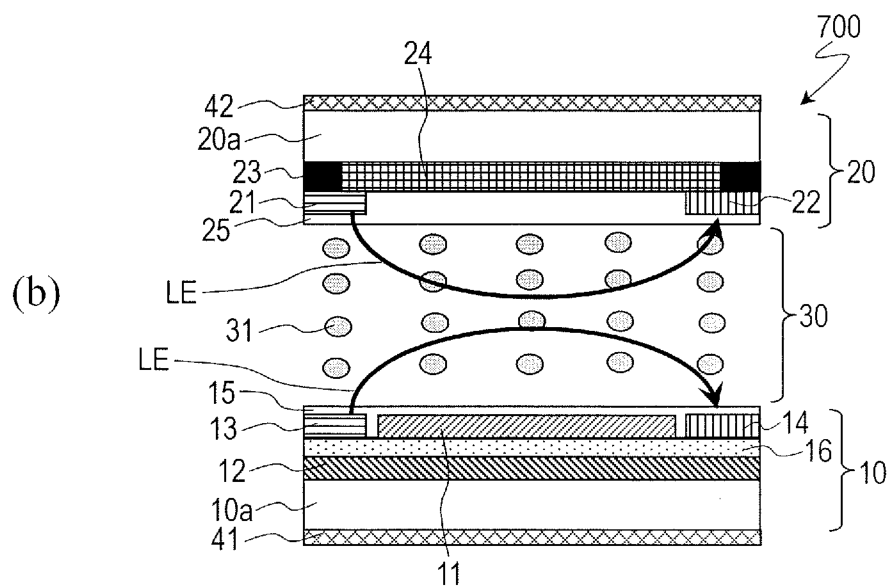

FIG. 20 shows a liquid crystal display device 700 of the present embodiment. FIGS. 20(*a*) and 20(*b*) are cross-sectional views schematically showing the liquid crystal display device 700, showing the alignment state of the liquid crystal molecules 31 when switching display from the black display state to the white display state and when switching display from the white display state to the black display state, respectively. That is, FIGS. 20(*a*) and 20(*b*) correspond to FIGS. 19(*a*) and 19(*b*), respectively, for the liquid crystal display device 600 of Embodiment 6.

The liquid crystal display device 700 of the present embodiment is different from the liquid crystal display device 600 of Embodiment 6 in that the second substrate 20 includes a fifth electrode 21 and a sixth electrode 22 (the third electrode pair), which are capable of producing the lateral electric field LE.

Each of the fifth electrode 21 and the sixth electrode 22 has an elongate shape (strip shape), and extends generally parallel to the initial alignment azimuthal direction D (i.e., generally parallel to the width direction of the pixels). That is, the fifth electrode 21 and the sixth electrode 22 extend in the same direction as the third electrode 13 and the fourth electrode 14. Therefore, the lateral electric field LE produced by the fifth electrode 21 and the sixth electrode 22 aligns the liquid crystal molecules 31 in the initial alignment azimuthal direction D. Herein, the fifth electrode 21 receives the same voltage as that for the third electrode 13, and the sixth electrode 22 receives the same voltage as that for the fourth electrode 14. That is, the fifth electrode 21 and the sixth electrode 22 are driven in sync with the third electrode 13 and the fourth electrode 14, and the fifth electrode 21 and the sixth electrode 22 function as the “OFF electrode” and the “second common electrode”, respectively. The fifth electrode 21 and the sixth electrode 22 may be formed from a transparent conductive material such as ITO, or from a metal material.

As described above, with the liquid crystal display device 600 of the present embodiment, the active matrix substrate 10 includes the third electrode 13 and the fourth electrode 14, which are capable of producing the lateral electric field LE, and the counter substrate 20 includes the fifth electrode 21 and the sixth electrode 22, which are capable of producing the lateral electric field LE, as are the third electrode 13 and the fourth electrode 14. By employing such a configuration, it is possible to quickly align more liquid crystal molecules 31 (not only those in the vicinity of the active matrix substrate 10, but also those in the vicinity of the counter substrate 20 ) in the initial alignment azimuthal direction D, thus further improving the response characteristics at falling edge.

(Embodiment 8)

Figure 21:
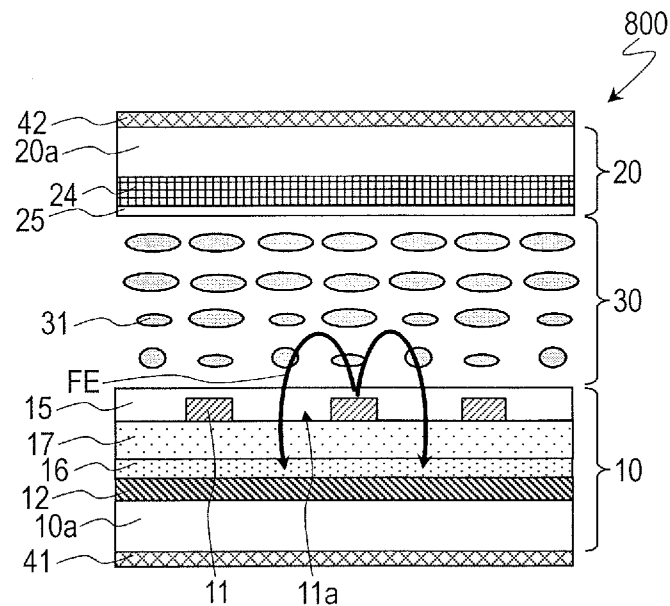
FIG. 21 (*a*) and (*b*) are cross-sectional views each schematically showing a liquid crystal display device 800 of an embodiment of the present invention, showing the alignment state of the liquid crystal molecules 31 when switching display from the black display state to the white display state and when switching display from the white display state to the black display state, respectively.
Figure 21:
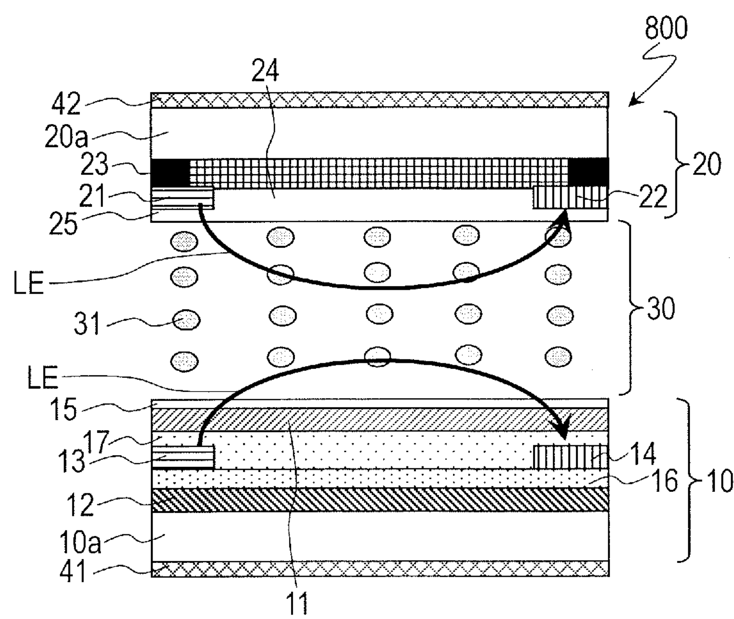

FIG. 21 shows a liquid crystal display device 800 of the present embodiment. FIGS. 21(*a*) and 21(*b*) are cross-sectional views schematically showing the liquid crystal display device 800, showing the alignment state of the liquid crystal molecules 31 when switching display from the black display state to the white display state and when switching display from the white display state to the black display state, respectively. That is, FIGS. 21(*a*) and 21(*b*) correspond to FIG. 17(*a*) and FIG. 18(*a*), respectively, for the liquid crystal display device 500 of Embodiment 5.

The liquid crystal display device 800 of the present embodiment is different from the liquid crystal display device 500 of Embodiment 5 in that the second substrate 20 includes a fifth electrode 21 and a sixth electrode 22 (the third electrode pair), which are capable of producing the lateral electric field LE.

Each of the fifth electrode 21 and the sixth electrode 22 has an elongate shape (strip shape), and extends generally parallel to the initial alignment azimuthal direction D (i.e., generally parallel to the width direction of the pixels). That is, the fifth electrode 21 and the sixth electrode 22 extend in the same direction as the third electrode 13 and the fourth electrode 14. Therefore, the lateral electric field LE produced by the fifth electrode 21 and the sixth electrode 22 aligns the liquid crystal molecules 31 in the initial alignment azimuthal direction D. Herein, the fifth electrode 21 receives the same voltage as that for the third electrode 13, and the sixth electrode 22 receives the same voltage as that for the fourth electrode 14. That is, the fifth electrode 21 and the sixth electrode 22 are driven in sync with the third electrode 13 and the fourth electrode 14, and the fifth electrode 21 and the sixth electrode 22 function as the "OFF electrode" and the "second common electrode", respectively.

As described above, with the liquid crystal display device 800 of the present embodiment, the active matrix substrate 10 includes the third electrode 13 and the fourth electrode 14, which are capable of producing the lateral electric field LE, and the counter substrate 20 includes the fifth electrode 21 and the sixth electrode 22, which are capable of producing the lateral electric field LE, as are the third electrode 13 and the fourth electrode 14. By employing such a configuration, it is possible to quickly align more liquid crystal molecules 31 (not only those in the vicinity of the active matrix substrate 10, but also those in the vicinity of the counter substrate 20) in the initial alignment azimuthal direction D, thus further improving the response characteristics at falling edge.

(Results of Testing Response Characteristics Improving Effect of Embodiments 5 to 8)

Now, for the liquid crystal display devices 500 to 800 of Embodiments 5 to 8 described above and a liquid crystal display device 1200 of Reference Example 2 shown in FIG. 22 and FIG. 23, the results of testing the effect of improving the response characteristics at falling edge will be discussed.

First, the configuration of the liquid crystal display device 1200 of Reference Example 2 will be described. FIGS. 22(*a*) and 22(*b*) are cross-sectional views schematically showing the liquid crystal display device 1200, and FIG. 23 is a plan view schematically showing the liquid crystal display device 1200. FIG. 23 shows a one-pixel region of the liquid crystal display device 1200, and FIGS. 22(*a*) and 22(*b*) show cross sections taken along line 22A-22A' and line 22B-22B', respectively, of FIG. 23. FIGS. 22(*a*) and 22(*b*) and FIG. 23 show a state in which no electric field is applied through the liquid crystal layer 30.

Figure 22:
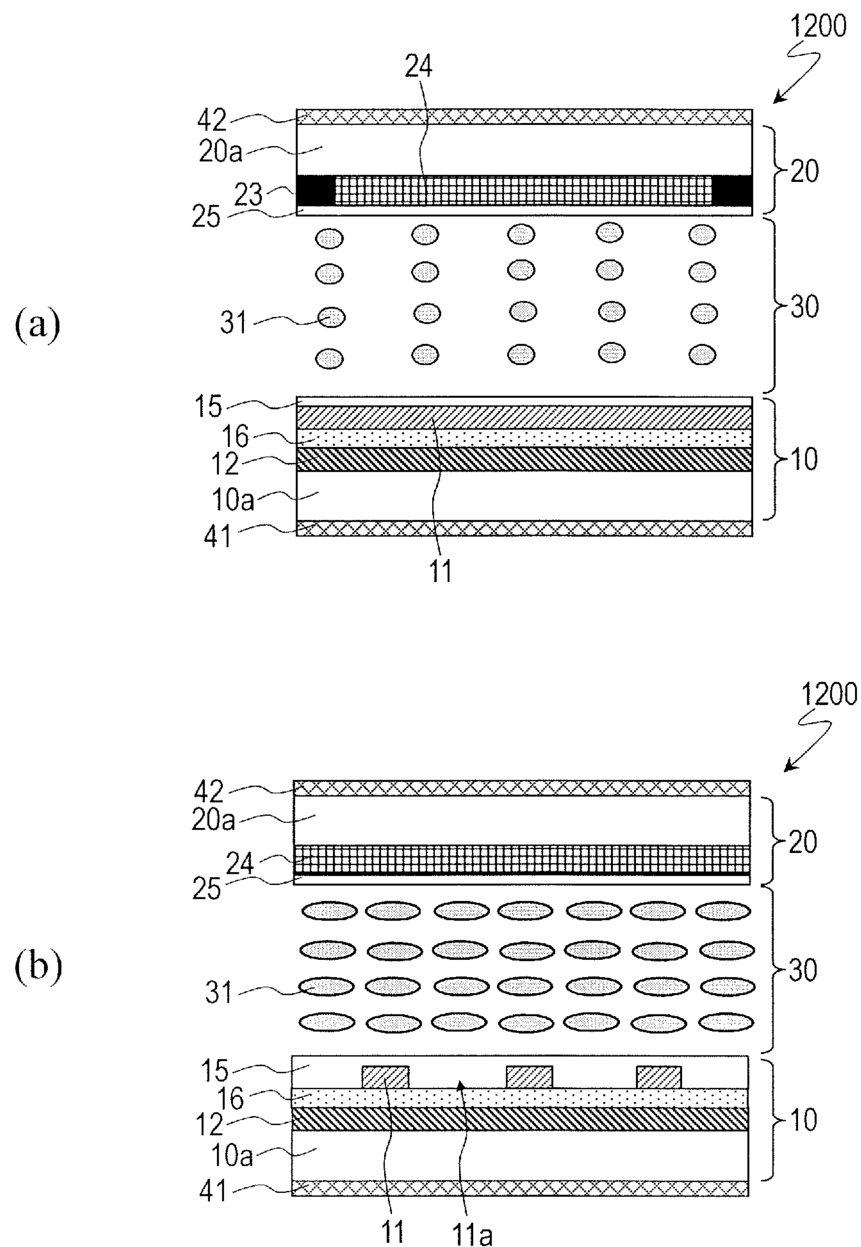
FIG. 22 (*a*) and (*b*) are cross-sectional views taken along line 22A-22A' and line 22B-22B', respectively, of FIG. 23, each schematically showing a liquid crystal display device 1200 of Reference Example 2.
Figure 23:
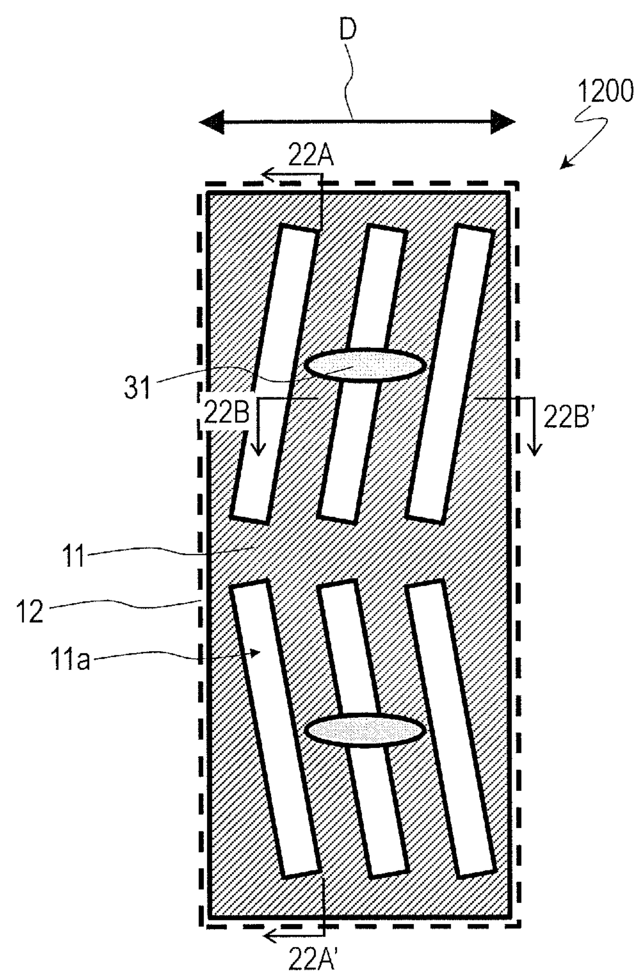
FIG. 23 A plan view schematically showing the liquid crystal display device 1200, showing a one-pixel region of the liquid crystal display device 1200.

The liquid crystal display device 1200 of Reference Example 2 has the same configuration as that of the liquid crystal display device 600 of Embodiment 6 except that the liquid crystal display device 1200 does not include the third electrode 13 and the fourth electrode 14 as shown in FIGS. 22(*a*) and 22(*b*) and FIG. 23.

Figure 24:
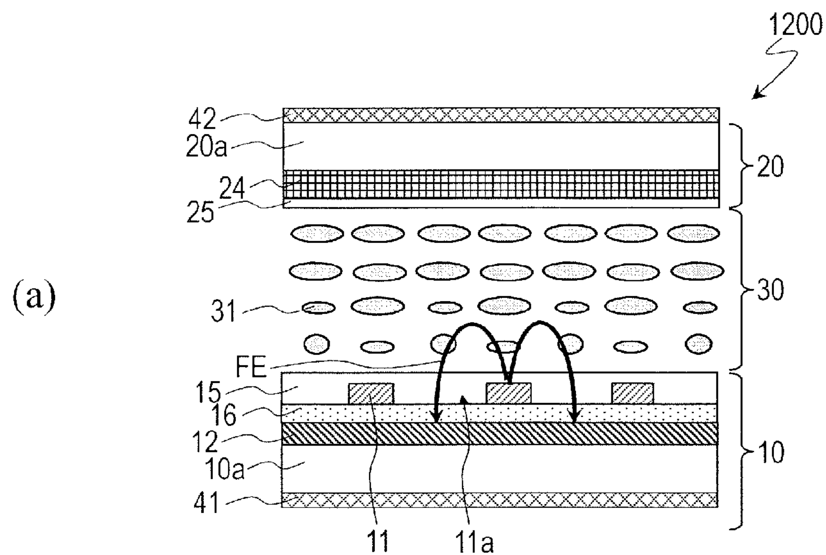
FIG. 24 (*a*) and (*b*) are a cross-sectional view and a plan view, respectively, schematically showing the alignment state of the liquid crystal molecules 31 when switching display from the black display state to the white display state on the liquid crystal display device 1200, wherein (a) shows a cross section taken along line 24A-24A' of (b).
Figure 24:
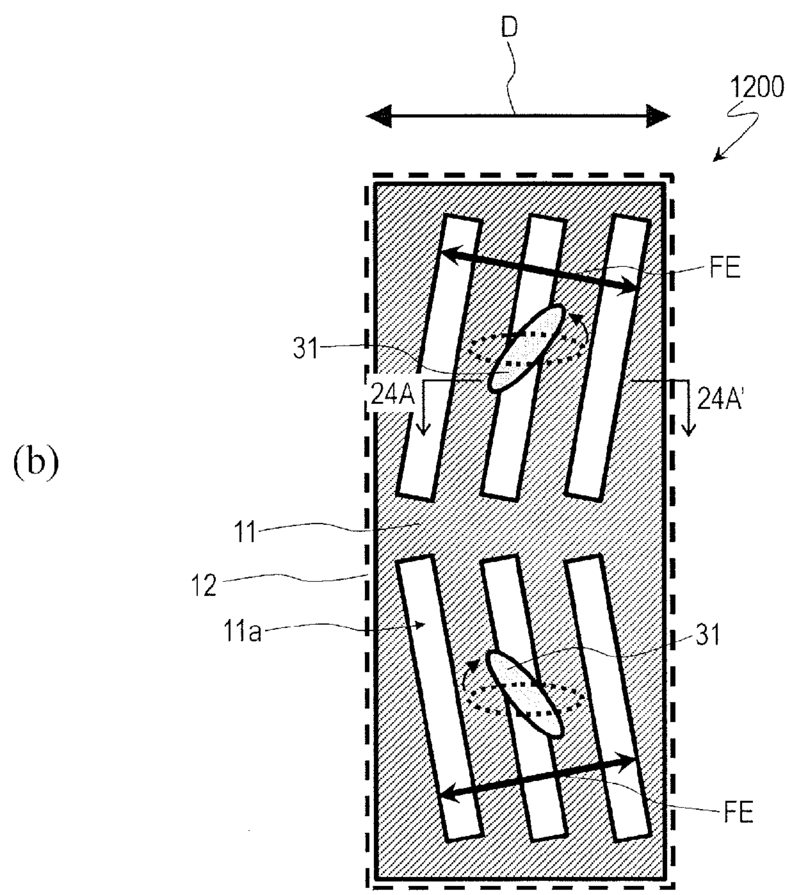

FIGS. 24(*a*) and 24(*b*) are a cross-sectional view and a plan view, respectively, schematically showing the alignment state of the liquid crystal molecules 31 when switching display from the black display state to the white display state on the liquid crystal display device 1200. FIG. 24(*a*) shows a cross section taken along line 24A-24A' of FIG. 24(*b*).

As shown in FIGS. 24(*a*) and 24(*b*), the fringe electric field 30 is produced through the liquid crystal layer 12 by the first electrode 11 and the second electrode 24 when displaying white. The fringe electric field FE aligns the liquid crystal molecules 31 in an azimuthal direction that is different from the initial alignment azimuthal direction D. Specifically, as shown in FIG.

24(*b*), the liquid crystal molecules 31 rotate counterclockwise in the upper half of the pixel, and the liquid crystal molecules 31 rotate clockwise in the lower half of the pixel.

Figure 25:
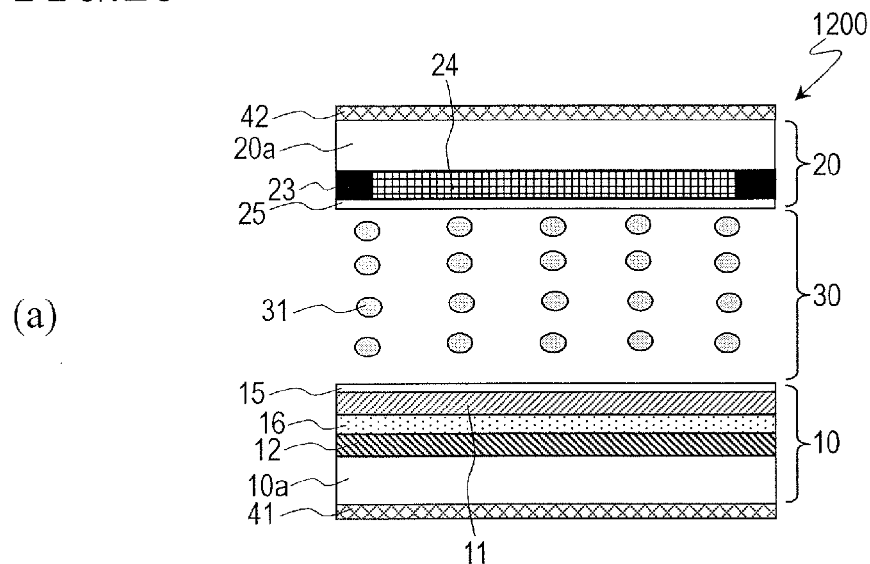
FIG. 25 (*a*) and (*b*) are a cross-sectional view and a plan view, respectively, schematically showing the alignment state of the liquid crystal molecules 31 when switching display from the white display state to the black display state on the liquid crystal display device 1200, wherein (a) shows a cross section taken along line 25A-25A' of (b).
Figure 25:
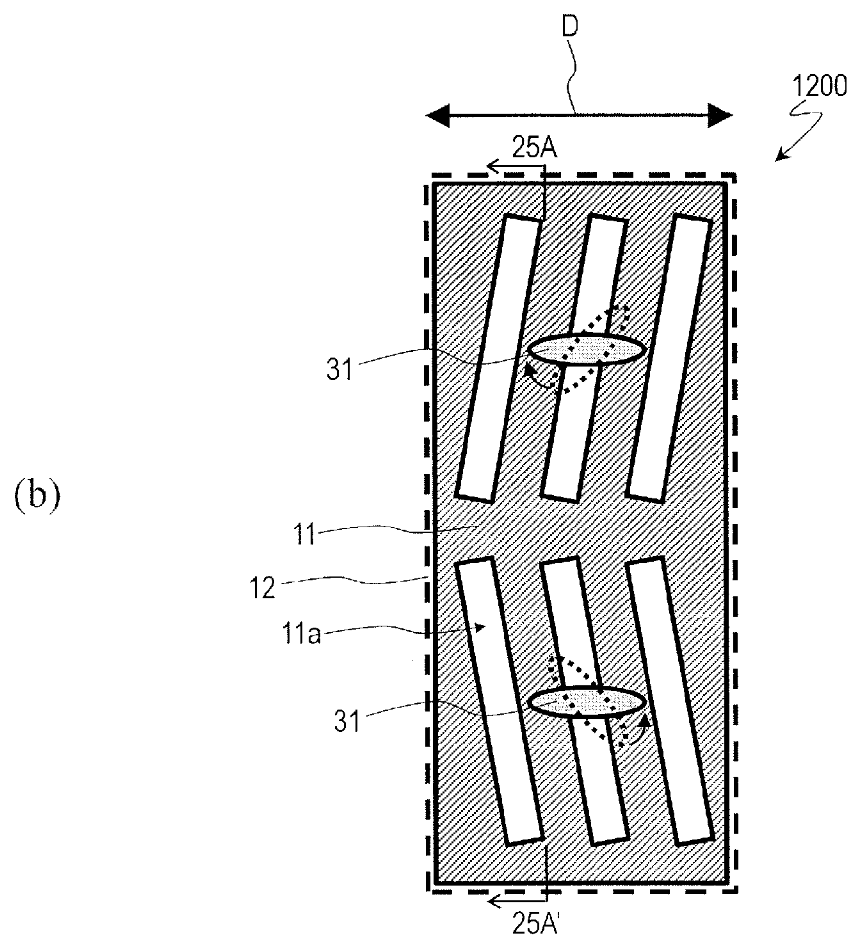

FIGS. 25(*a*) and 25(*b*) are a cross-sectional view and a plan view, respectively, schematically showing the alignment state of the liquid crystal molecules 31 when switching display from the white display state to the black display state on the liquid crystal display device 1200. FIG. 25(*a*) shows a cross section taken along line 25A-25A' of FIG. 25(*b*).

As shown in FIGS. 25(*a*) and 25(*b*), no electric field is produced through the liquid crystal layer 30 when displaying black. The liquid crystal molecules 31 change their alignment azimuthal direction to return to the initial alignment azimuthal direction D. The response speed depends on the elastic constant or the viscosity of the liquid crystal material.

Next, the test results will be discussed. The test was done by way of a simulation using LCD-Master 3D from Shintech, Inc. Cell parameters set for the simulation are as shown in Table 3 below. The cell parameters shown therein include the refractive index anisotropy Δn, the dielectric constant anisotropy Δ∈ and the viscosity of the liquid crystal material, the retardation Re of the liquid crystal layer 30, the azimuthal direction in which the slits 11*a* the pixel electrode 11 extend, the initial alignment azimuthal direction D of the liquid crystal molecules 31, and the interval L and the width S of the slits 11*a* of the pixel electrode 11. Note that the values of the azimuthal direction in which the slits 11*a* extend and the initial alignment azimuthal direction D of the liquid crystal molecules 31 are defined with 0° being the 3 o'clock direction on the display surface seen as a clockface. Table 3 also shows the number and position of electrode pairs capable of producing the lateral electric field LE.

TABLE 3

| | | | Reference | Embodiments | | | |
|---|---|---|---|---|---|---|---|
| | | | Example 2 | 5 | 6 | 7 | 8 |
| Liquid crystal material | Refractive index anisotropy Δn | | | | 0.1 | | |
| | Dielectric constant anisotropy Δϵ | | | | −3.6 | | |
| | Viscosity | | | | 120 cps | | |
| Retardation of liquid crystal layer Re | | | | | 340 nm | | |
| Azimuthal direction of slits | | | | | 90 ± 10° | | |
| Initial alignment azimuthal direction | | | | | 0° | | |
| L/S | | | | | 3/4 μm | | |
| Electrode pair producing transverse electric field | Number | | 0 | 1 | 1 | 2 | 2 |
| | Position | Counter substrate side | Absent | Absent | Absent | Present | Present |
| | | Same layer as pixel electrode | Absent | Absent | Present | Present | Absent |
| | | Between pixel electrode and counter electrode | Absent | Present | Absent | Absent | Present |

Figure 26:
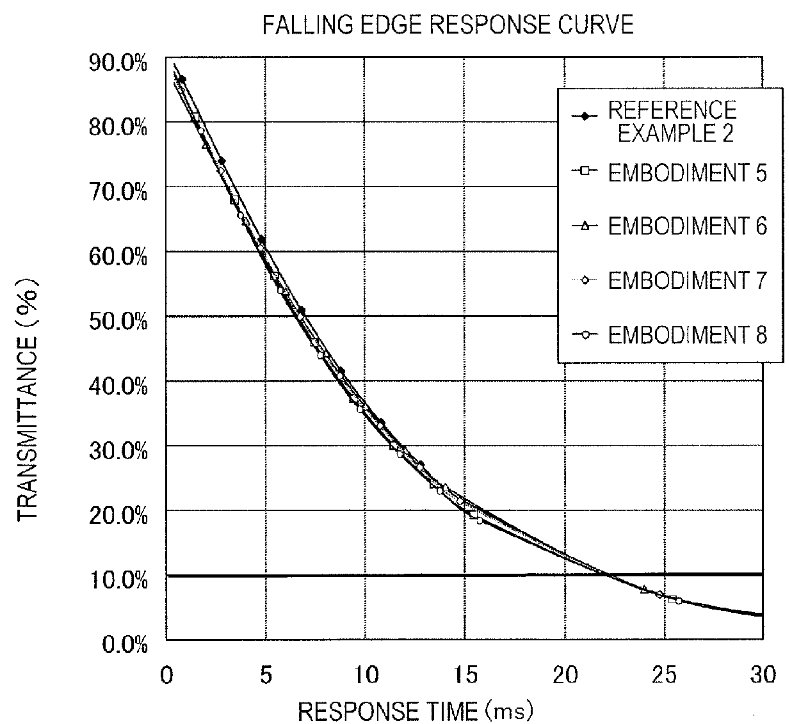
FIG. 26 (*a*) is a graph showing falling edge response curves of the liquid crystal display devices 500 to 800 of Embodiments 5 to 8 and the liquid crystal display device 1200 of Reference Example 2, and (b) is a graph showing, on an enlarged scale, a part of (a) in the vicinity of 10% transmittance.
Figure 26:
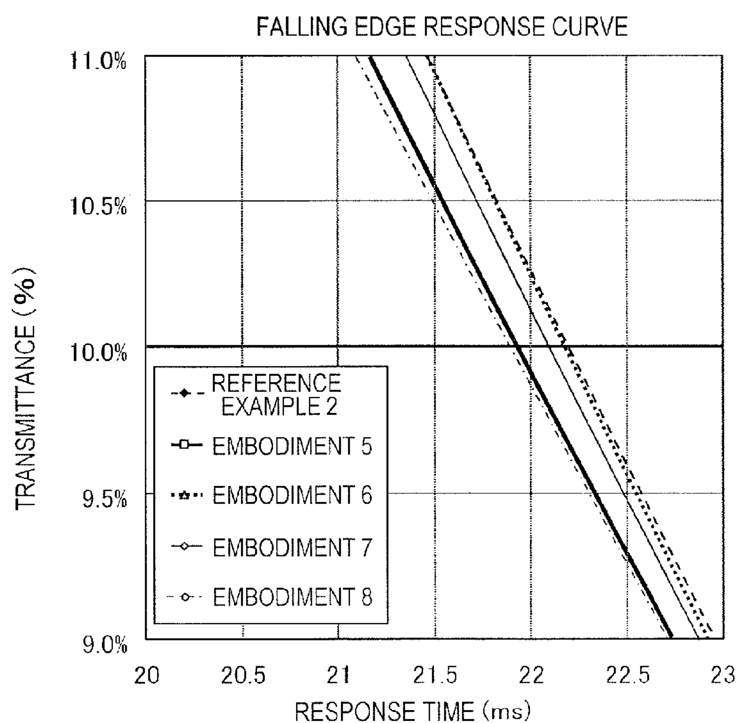

FIG. 26(*a*) is a graph showing the falling edge response curves of the liquid crystal display devices 500 to 800 of Embodiments 5 to 8 and the liquid crystal display device 1200 of Reference Example 2. The horizontal axis of FIG. 26(*a*) (the response time) is defined with zero being the point in time when transmittance becomes 90% after a predetermined voltage is applied between the third electrode 13 and the fourth electrode 14 (needless to say, the voltage between the first electrode 11 and the second electrode 12 is OFF) from the white display state (100% transmittance) for the liquid crystal display devices 500 to 800 of Embodiments 5 to 8, and is defined with zero being the point in time when transmittance becomes 90% after the voltage between the first electrode 11 and the second electrode 12 is turned OFF from the white display state for the liquid crystal display device 1200 of Reference Example 2. FIG. 26(*b*) is a graph showing, on an enlarged scale, a part of FIG. 26(*a*) in the vicinity of 10% transmittance (on the vertical axis).

It can be seen from FIGS. 26(*a*) and 26(*b*) that the response characteristics at falling edge are better for the liquid crystal display devices 500 to 800 of Embodiments 5 to 8 than for the liquid crystal display device 1200 of Reference Example 2. Table 4 below shows the response time at falling edge (the amount of time taken for transmittance to change from 90% to 10%) for the liquid crystal display devices 500 to 800 of Embodiments 5 to 8 and for the liquid crystal display device 1200 of Reference Example 2.

TABLE 4

| | Reference | Embodiments | | | |
|---|---|---|---|---|---|
| | Example 2 | 5 | 6 | 7 | 8 |
| Falling edge response time [ms] | 22.2 | 21.9 | 22.2 | 22.1 | 22.1 |

As can be seen from Table 4, the response time of the liquid crystal display devices 500 to 800 of Embodiments 5 to 8 is less than or equal to that of the liquid crystal display device 1200 of Reference Example 2.

Thus, the liquid crystal display devices 500 to 800 of Embodiments 5 to 8 have improved response characteristics at falling edge. This is because during response at falling edge, the liquid crystal molecules 31 are forced back to the initial alignment azimuthal direction by the lateral electric field LE produced by the third electrode 13 and the fourth electrode 14.

In contrast, with an ordinary liquid crystal display device such as the liquid crystal display device 1200 of Reference Example 2, since no electric field is applied through the liquid crystal layer at falling edge response (OFF response), the liquid crystal molecules return to the initial alignment azimuthal direction through the liquid crystal relaxation phenomenon. Thus, the response time is significantly dependent on the viscosity of the liquid crystal material. Particularly, the falling edge response time becomes longer as the temperature lowers and the viscosity increases.

On the other hand, with the liquid crystal display devices 500 to 800 of Embodiments 5 to 8, the liquid crystal molecules 31 are returned to the initial alignment azimuthal direction D by having the lateral electric field LE acting upon the liquid crystal molecules 31 at falling edge response, making it possible to realize sufficient response characteristics even when the viscosity of the liquid crystal material increases at a low temperature. It is possible to improve the response characteristics by having a period in which the lateral electric field LE is applied through the liquid crystal layer 30 and a period in which the fringe electric field FE is applied therethrough both within one frame (within one vertical scanning period), as shown in FIG. 6(*c*), not only when switching from the white display state to the black display state but also when switching from the white display state to an intermediate gray level display state (or when switching from an intermediate gray level display state of a relatively high gray level to another intermediate gray level display state of a relatively low gray level). Therefore, it is possible to improve the response characteristics when switching display between any gray levels.

Note that as can be seen from a comparison between the test results for Embodiments 1 to 4 and the test results for Embodiments 5 to 8, the response characteristics improving effect of Embodiments 5 to 8 is slightly lower than that of Embodiments 1 to 4. It is believed that this is because the interval between the third electrode 13 and the fourth electrode 14 is longer for Embodiments 5 to 8 than for Embodiments 1 to 4 (typically, the aspect ratio of the pixel is 1:3) so that the intensity of the lateral electric field LE becomes lower for Embodiments 5 to 8. It is understood that the response characteristics at falling edge can be further improved also for Embodiments 5 to 8 by setting a sufficiently high voltage to be applied between the third electrode 13 and the fourth electrode 14.

INDUSTRIAL APPLICABILITY

According to the embodiments of the present invention, it is possible to improve the response characteristics of a liquid crystal display device that controls the alignment state of liquid crystal molecules using a fringe electric field.

REFERENCE SIGNS LIST

10 Active matrix substrate (first substrate)
11 First electrode (pixel electrode)
12 Second electrode (first common electrode)
13 Third electrode (OFF electrode)
14 Fourth electrode (second common electrode)
15, 25 Alignment film
16 First insulating layer
17 Second insulating layer
19*a* First TFT
19*b* Second TFT
20 Counter substrate (second substrate)
21 Fifth electrode (OFF electrode)
22 Sixth electrode (second common electrode)
23 Light-blocking layer (black matrix)
24 Color filter layer
30 Liquid crystal layer
31 Liquid crystal molecules
41, 42 Polarizer
CH1, CH2 Contact hole
GL1 First scanning line (first gate bus line)
GL2 Second scanning line (second gate bus line)
SL Signal line (source bus line)
100, 200, 300, 400 Liquid crystal display device
500, 600, 700, 800 Liquid crystal display device

The invention claimed is:

1. A liquid crystal display device having a plurality of pixels arranged in a matrix pattern, the liquid crystal display device comprising:
- a first substrate and a second substrate provided so as to oppose each other; and
- a liquid crystal layer provided between the first substrate and the second substrate,
- the first substrate comprising:
- an alignment film provided so as to be in contact with the liquid crystal layer, the alignment film defining an initial alignment azimuthal direction, which is an alignment azimuthal direction of liquid crystal molecules when no electric field is applied through the liquid crystal layer;
- a first electrode and a second electrode capable of producing a fringe electric field that aligns the liquid crystal molecules in an azimuthal direction that is different from the initial alignment azimuthal direction; and
- a third electrode and a fourth electrode capable of producing a lateral electric field that aligns the liquid crystal molecules in the initial alignment azimuthal direction.

2. The liquid crystal display device according to claim 1, wherein the liquid crystal molecules have a negative dielectric anisotropy.

3. The liquid crystal display device according to claim 2, wherein the third electrode and the fourth electrode each extend generally parallel to the initial alignment azimuthal direction.

4. The liquid crystal display device according to claim 3, wherein directions in which the third electrode and the fourth electrode extend and the initial alignment azimuthal direction are generally parallel to a longitudinal direction of the pixels.

5. The liquid crystal display device according to claim 3, wherein directions in which the third electrode and the fourth electrode extend and the initial alignment azimuthal direction are generally parallel to a width direction of the pixels.

6. The liquid crystal display device according to claim 1, wherein the first electrode has at least one slit and is provided on the second electrode with at least one insulating layer therebetween.

7. The liquid crystal display device according to claim 6, wherein:
- the at least one insulating layer includes a first insulating layer covering the second electrode and a second insulating layer provided on the first insulating layer; and
- the third electrode and the fourth electrode are provided between the first insulating layer and the second insulating layer.

8. The liquid crystal display device according to claim 6, wherein the third electrode and the fourth electrode are provided in the same layer as the first electrode.

9. The liquid crystal display device according to claim 1, wherein the second substrate includes a fifth electrode and a sixth electrode capable of producing a lateral electric field that aligns the liquid crystal molecules in the initial alignment azimuthal direction.

10. The liquid crystal display device according to claim 1, wherein:
- display is produced in a normally black mode;
- the fringe electric field is produced by the first electrode and the second electrode when displaying white; and
- the lateral electric field is produced by the third electrode and the fourth electrode when displaying black.

11. The liquid crystal display device according to claim 10, further comprising:
- a pair of polarizers opposing each other with at least the liquid crystal layer therebetween, wherein:
- the pair of polarizers are placed in a crossed Nicols arrangement; and
- a transmission axis of one of the pair of polarizers is generally parallel to the initial alignment azimuthal direction, and a transmission axis of the other polarizer is generally perpendicular to the initial alignment azimuthal direction.

* * * * *